(12) United States Patent
Ueda et al.

(10) Patent No.: US 7,330,011 B2
(45) Date of Patent: Feb. 12, 2008

(54) MOTOR DRIVING APPARATUS

(75) Inventors: Mitsuo Ueda, Nishinomiya (JP);
Hideki Nakata, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/891,141

(22) Filed: Jul. 15, 2004

(65) Prior Publication Data
US 2005/0012490 A1    Jan. 20, 2005

(30) Foreign Application Priority Data
Jul. 18, 2003    (JP) .................. 2003-277102

(51) Int. Cl.
*H02P 23/00*    (2006.01)
(52) U.S. Cl. .................. 318/807; 318/808; 318/812; 318/823; 318/801; 318/254
(58) Field of Classification Search ......... 318/799–807
See application file for complete search history.

(56) References Cited

U.S. PATENT DOCUMENTS

| | | | | |
|---|---|---|---|---|
| 3,949,283 A | * | 4/1976 | Okuyama et al. .......... | 318/138 |
| 3,962,614 A | * | 6/1976 | Rettig .......................... | 318/801 |
| 4,058,755 A | * | 11/1977 | Honbu et al. .............. | 318/47 |
| 4,227,138 A | * | 10/1980 | Espelage et al. ........... | 318/802 |
| 4,451,112 A | * | 5/1984 | Hattori et al. .............. | 318/778 |
| 4,488,053 A | * | 12/1984 | Cronin ....................... | 290/4 C |
| 4,516,664 A | * | 5/1985 | Anzai et al. ................ | 187/296 |
| 4,550,281 A | * | 10/1985 | Hirata ........................ | 318/723 |
| 4,629,959 A | * | 12/1986 | Okuyama et al. .......... | 318/727 |
| 4,881,022 A | * | 11/1989 | Boys .......................... | 318/800 |
| 4,992,920 A | * | 2/1991 | Davis ......................... | 363/36 |
| 5,023,531 A | * | 6/1991 | Altemose et al. ........... | 318/471 |
| 5,050,057 A | * | 9/1991 | Notohara et al. ............ | 363/37 |
| 5,300,873 A | * | 4/1994 | Otani et al. ................. | 318/807 |
| 5,510,689 A | * | 4/1996 | Lipo et al. .................. | 318/809 |
| 5,587,641 A | * | 12/1996 | Rozman ..................... | 318/801 |

(Continued)

FOREIGN PATENT DOCUMENTS

CN    1245283    2/2000

(Continued)

OTHER PUBLICATIONS

"*Motor Technology Utility Handbook*", Motor Technology Utility Handbook Editorial Committee, The Nikkan Kogyo Shimbun, Ltd., Mar. 23, 2001, pp. 145-146 (partial English translation).

*Primary Examiner*—Lincoln Donovan
*Assistant Examiner*—Renata McCloud
(74) *Attorney, Agent, or Firm*—Wenderoth, Lind & Ponack, L.L.P.

(57) ABSTRACT

A motor driving apparatus includes an inverter circuit for converting an output of a rectifier circuit connected to a single-phase AC power supply into a driving voltage, and outputting the driving voltage to a brushless motor, and an inverter control unit for controlling the amplitude value of the voltage outputted from the inverter to the brushless motor so as to minimize a difference between a command rpm indicated by an external command signal and an actual rpm derived from an estimated phase of the rotor, wherein the command rpm is set to an rpm outside a predetermined range of rpms.

29 Claims, 12 Drawing Sheets

U.S. PATENT DOCUMENTS

| | | | |
|---|---|---|---|
| 5,694,010 A * | 12/1997 | Oomura et al. | 318/254 |
| 5,798,631 A * | 8/1998 | Spee et al. | 322/25 |
| 5,945,802 A * | 8/1999 | Konrad et al. | 318/807 |
| 6,242,883 B1 * | 6/2001 | Strunk | 318/767 |
| 6,244,061 B1 * | 6/2001 | Takagi et al. | 62/229 |
| 6,472,844 B2 * | 10/2002 | Luerkens | 318/768 |
| 6,479,956 B1 * | 11/2002 | Kawabata et al. | 318/254 |
| 6,483,270 B1 * | 11/2002 | Miyazaki et al. | 318/700 |
| 6,486,627 B1 * | 11/2002 | Gabrys | 318/161 |
| 6,507,505 B2 * | 1/2003 | Oka et al. | 363/47 |
| 6,545,438 B1 * | 4/2003 | Mays, II | 318/254 |
| 6,583,593 B2 * | 6/2003 | Iijima et al. | 318/254 |
| 6,639,370 B1 * | 10/2003 | Gabrys | 318/161 |
| 6,731,082 B2 * | 5/2004 | Pelonis | 318/254 |
| 6,781,802 B2 * | 8/2004 | Kato et al. | 361/22 |
| 2002/0113569 A1 * | 8/2002 | Iijima et al. | 318/727 |

FOREIGN PATENT DOCUMENTS

| | | |
|---|---|---|
| JP | 10-150795 | 6/1998 |
| JP | 10150795 A * | 6/1998 |

* cited by examiner

MOTOR DRIVING APPARATUS

FIELD OF THE INVENTION

The present invention relates to a motor driving apparatus and, more particularly, to a motor driving apparatus for driving a brushless motor using a power conversion circuit.

BACKGROUND OF THE INVENTION

A brushless motor generally has a permanent magnet as a rotor, and a current according to the position of the permanent magnet is applied to a coil as a component of the brushless motor, by using a power conversion circuit such as an inverter, thereby driving the brushless motor. A motor driving apparatus for driving such a brushless motor generally includes a power conversion circuit such as an inverter, and a control unit for controlling the power conversion circuit on the basis of the position of the rotor.

As a method for detecting the position of the rotor that is a permanent magnet, a position sensor such as a Hall element may be used, or the position of the rotor may be estimated from a current and a voltage applied to the coil (refer to "Practical Handbook of Motor Technology" editors version (chief editor: Daiki Ebihara), The Nikkan Kogyo Shinbun, Ltd., Mar. 23, 2001, pp. 145~153).

As a method for controlling the rpm of the brushless motor, generally, the rpm of the rotor is calculated from rotor position information which is obtained by the above-mentioned position detection method, and a voltage or a current to be applied to the coil is adjusted on the basis of the calculated rpm and a command rpm. Thereby, the brushless motor can be driven at an arbitrary rpm.

However, when the input voltage of the power conversion circuit such as an inverter pulses at a constant frequency, if the brushless motor is driven at an arbitrary rpm as described above, noise and vibration may occur, or a harmonic current appears at the input side of the power conversion circuit, at an rpm that satisfies specific conditions.

Especially when the capacitance of a capacitor or a reactor provided before the power conversion circuit is reduced, a frequency component of the current for driving the brushless motor appears at the power supply side. The reason is as follows. The capacitor or the reactor functions as a filter to block a high-frequency component of the motor driving current that affects the power supply, and the effect of the filter is undesirably reduced due to reduction in the capacitances of these components. When the harmonic component of the motor driving current which appears at the power supply side increases, the motor driving apparatus cannot satisfy the IEC (International Electrotechnical Commission) standards as international harmonic standards.

SUMMARY OF THE INVENTION

The present invention is made to solve the above-described problems and has for its object to provide a motor driving apparatus satisfying the IEC harmonics standards, which can prevent noise and vibration from occurring, and a harmonic component of a motor driving current from appearing at the input end of a power conversion circuit, even when a voltage pulse of a constant frequency occurs at the input end of the power conversion circuit.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a motor driving apparatus for driving a brushless motor comprises: a power conversion circuit for converting an output voltage of an AC power supply into a driving voltage, and outputting the driving voltage to the brushless motor; and a control unit for controlling the power conversion circuit so that the frequency of an output current of the power conversion circuit is not fixed to a specific frequency. Therefore, it is possible to prevent the brushless motor from being driven at an rpm that makes the operation of the brushless motor unstable, thereby realizing stable drive control for the brushless motor. Accordingly, even when voltage pulses of a constant frequency occur at the input end of the power conversion circuit, it is possible to prevent noise and vibration from occurring, and a harmonic component of the motor driving current from appearing at the input end of the power conversion circuit, resulting in a motor driving apparatus that satisfies the IEC harmonic standards.

According to a second aspect of the present invention, in the motor driving apparatus according to the first aspect, the AC power supply comprises a single-phase AC power supply, and a rectifier circuit having an input connected to the single-phase AC power supply; the power conversion circuit has an inverter circuit for converting an output voltage of the rectifier circuit into a driving voltage, and outputting the driving voltage to the brushless motor; and the control unit is an inverter control unit for controlling the inverter circuit so that the frequency of an output current of the inverter circuit is not fixed to a specific frequency. Therefore, it is possible to prevent the brushless motor from being driven at an rpm that makes the operation of the brushless motor unstable, thereby realizing stable drive control for the brushless motor. As a result, a motor driving apparatus using an inverter circuit, which satisfies the IEC harmonic standards, can be realized.

According to a third aspect of the present invention, in the motor driving apparatus according to the second aspect, the specific frequency includes a frequency that is an integral multiple of the frequency of the AC power supply and its vicinity. Therefore, it is possible to prevent unpleasant noise and vibration from occurring due to a beat phenomenon that is caused by the driving current supplied to the brushless motor, and a variable frequency component of the output voltage of the AC power supply, resulting in stable drive control for the brushless motor.

According to a fourth aspect of the present invention, in the motor driving apparatus according to the second aspect, the brushless motor is a three-phase brushless motor; and the specific frequency is an integral multiple of a frequency that is obtained by multiplying the frequency of the AC power supply by $\frac{1}{6}$. Therefore, it is possible to prevent a harmonic current that exceeds the IEC standard values from occurring due to the n-th order harmonic of the frequency of the AC power supply, thereby realizing stable drive control for the brushless motor.

According to a fifth aspect of the present invention, in the motor driving apparatus according to the second aspect, the inverter control unit controls the inverter circuit so that the frequency of the output current of the inverter circuit continuously varies. Therefore, it is possible to disperse a frequency spectrum of a current which is generated when the brushless motor driving current is modulated by the n-th order harmonic of the frequency of the AC power supply, thereby preventing a harmonic current that exceeds the IEC standard values from occurring, resulting in stable drive control for the brushless motor.

According to the sixth aspect of the present invention, in the motor driving apparatus according to the fifth aspect, the frequency of the output current of the inverter circuit varies at random. Therefore, it is possible to eliminate the possibility of noise and vibration, which are caused by changing the frequency of the output current of the inverter circuit.

According to a seventh aspect of the present invention, in the motor driving apparatus according to the second aspect, the power conversion circuit includes a capacitor for charging a regenerative current from the brushless motor, said capacitor being placed upstream from the inverter circuit. Therefore, it is possible to suppress an increase in the inverter input voltage, which occurs when the motor is stopped or the switching operation of the inverter circuit is stopped, thereby preventing destruction of the elements and the like.

According to an eighth aspect of the present invention, in the motor driving apparatus according to the second aspect, the power conversion circuit includes an inductor for cutting noise that occurs in the inverter circuit, the inductor being connected between the inverter circuit and the AC power supply. Therefore, it is possible to reduce switching noise that occurs at the input end of the inverter circuit, thereby increasing the power factor of the inverter circuit input current, resulting in an improved current waveform.

According to a ninth embodiment of the present invention, in the motor driving apparatus according to the first aspect, the AC power supply comprises a three-phase AC power supply and a three-phase rectifier circuit having an input connected to the three-phase AC power supply; the voltage conversion circuit has an inverter circuit for converting an output voltage of the three-phase rectifier circuit into a driving voltage, and outputting the driving voltage to the brushless motor; and the control unit is an inverter controller for controlling the inverter circuit so that the frequency of an output current from the inverter circuit is not fixed to a specific frequency. Therefore, it is possible to prevent the brushless motor from being driven at an rpm that makes the operation of the brushless motor unstable, thereby realizing stable drive control for the brushless motor, resulting in a motor driving apparatus using an inverter circuit, which satisfies the IEC harmonic standards.

According to a tenth aspect of the present invention, in the motor driving apparatus according to the first aspect, the AC power supply is a single-phase AC power supply; the power conversion circuit is a cycloconverter circuit for converting an output voltage of the single-phase AC power supply into a driving voltage, and outputting the driving voltage to the brushless motor; and the control unit is a cycloconverter control unit for controlling the cycloconverter circuit so that the frequency of an output current of the cycloconverter circuit is not fixed to a specific frequency. Therefore, it is possible to prevent the brushless motor from being driven at an rpm that makes the operation of the brushless motor unstable, thereby realizing stable drive control for the brushless motor, resulting in a motor driving apparatus using a cycloconverter circuit, which satisfies the IEC harmonic standards.

According to an eleventh aspect of the present invention, there is provided a compressor having a brushless motor, and a motor driving apparatus for driving the brushless motor, and the motor driving apparatus is a motor driving apparatus according to the first aspect. Therefore, it is possible to prevent the brushless motor from being driven at an rpm that makes the operation of the brushless motor unstable, thereby minimizing noise and vibration during operation of the compressor, and reducing a harmonic current component to be introduced in the driving current.

According to a twelfth aspect of the present invention, there is provided an air conditioner having a compressor including a brushless motor, and a motor driving apparatus for driving the brushless motor, and the motor driving apparatus is a motor driving apparatus according to the first aspect. Therefore, it is possible to prevent the brushless motor from being driven at an rpm that makes the operation of the brushless motor unstable, thereby minimizing noise and vibration during operation of the air conditioner, and reducing a harmonic current component to be introduced in the driving current.

According to a thirteenth aspect of the present invention, there is provided a refrigerator having a compressor including a brushless motor, and a motor driving apparatus for driving the brushless motor, and the motor driving apparatus is a motor driving apparatus according to the first aspect. Therefore, it is possible to prevent the brushless motor from being driven at an rpm that makes the operation of the brushless motor unstable, thereby minimizing noise and vibration during operation of the refrigerator, and reducing a harmonic current component to be introduced in the driving current.

According to a fourteenth aspect of the present invention, there is provided an electric washing machine having a brushless motor, and a motor driving apparatus for driving the brushless motor, and the motor driving apparatus is a motor driving apparatus according to the first aspect. Therefore, it is possible to prevent the brushless motor from being driven at an rpm that makes the operation of the brushless motor unstable, thereby minimizing noise and vibration during operation of the washing machine, and reducing a harmonic current component to be introduced in the driving current.

According to a fifteenth aspect of the present invention, there is provided an air blower having a brushless motor, and a motor driving apparatus for driving the brushless motor, and the motor driving apparatus is a motor driving apparatus according to the first aspect. Therefore, it is possible to prevent the brushless motor from being driven at an rpm that makes the operation of the brushless motor unstable, thereby minimizing noise and vibration during operation of the air blower, and reducing a harmonic current component to be introduced in the driving current.

According to a sixteenth aspect of the present invention, there is provided an electric vacuum cleaner having a brushless motor, and a motor driving apparatus for driving the brushless motor, and the motor driving apparatus is a motor driving apparatus according to the first aspect. Therefore, it is possible to prevent the brushless motor from being driven at an rpm that makes the operation of the brushless motor unstable, thereby minimizing noise and vibration during operation of the vacuum cleaner, and reducing a harmonic current component to be introduced in the driving current.

According to a seventeenth aspect of the present invention, there is provided an electric dryer having a compressor including a brushless motor, and a motor driving apparatus for driving the brushless motor, and the motor driving apparatus is a motor driving apparatus according to the first aspect. Therefore, it is possible to prevent the brushless motor from being driven at an rpm that makes the operation of the brushless motor unstable, thereby minimizing noise and vibration during operation of the dryer, and reducing a harmonic current component to be introduced in the driving current.

According to an eighteenth aspect of the present invention, there is provided a heat pump type hot-water supply unit having a compressor including a brushless motor, and a motor driving apparatus for driving the brushless motor, and the motor driving apparatus is a motor driving apparatus according to the first aspect. Therefore, it is possible to prevent the brushless motor from being driven at an rpm that makes the operation of the brushless motor unstable, thereby minimizing noise and vibration during operation of the hot-water supply unit, and reducing a harmonic current component to be introduced in the driving current.

DETAILED DESCRIPTION OF THE PREFERRED EMBODIMENTS

Embodiment 1

Figure 1A:
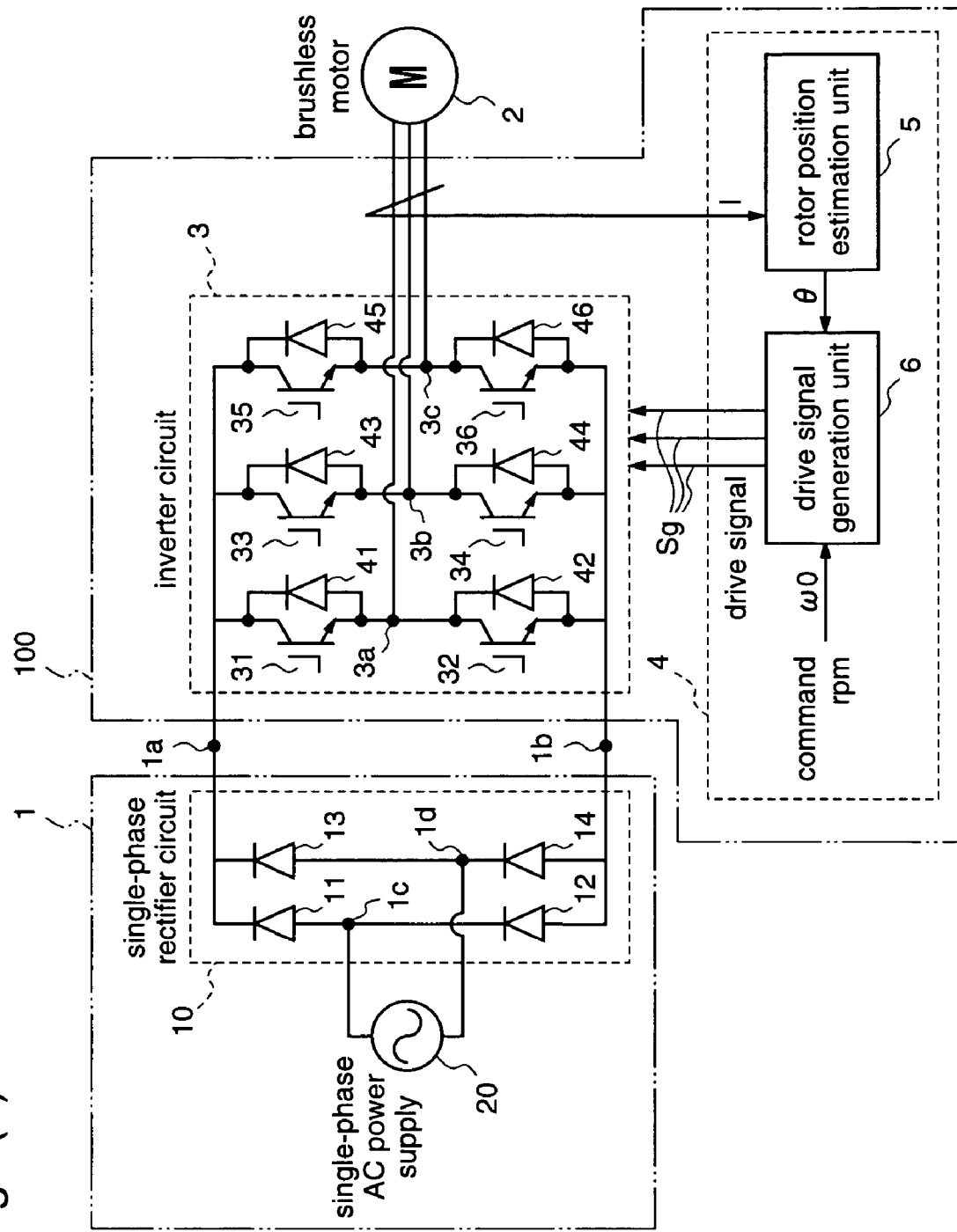
FIG. 1(a) is a block diagram for explaining a motor driving apparatus according to a first embodiment of the present invention.

FIG. 1 (a) is a block diagram for explaining a motor driving apparatus 100a according to a first embodiment of the present invention.

The motor driving apparatus 100a according to the first embodiment has a DC power supply 1, and drives a three-phase brushless motor 2 with a three-phase AC outputted from the AC power supply 1. The DC power supply 1 comprises a single-phase AC power supply 20 and a single-phase rectifier circuit 10 having an input connected to the single-phase AC power supply 20, and hereinafter, it is simply referred to as a power supply. Further, the brushless motor 2 is always driven at an arbitrary rpm that matches the frequency of an AC current applied to the brushless motor 2. The motor driving apparatus 100 includes an inverter circuit 3 that is connected to the single-phase rectifier circuit 10 of the power supply 1, and outputs a driving voltage to the brushless motor 2, and an inverter controller 4 for controlling the inverter circuit 3 on the basis of an rpm command signal supplied from the outside.

The single-phase rectifier circuit 10 includes first and second diodes 11 and 12 which are connected in series, and third and fourth diodes 13 and 14 which are connected in series. The cathodes of the first and third diodes 11 and 13 are connected to each other, and the connection node is an output node 1a of the single-phase rectifier circuit 10. The anodes of the second and fourth diodes 12 and 14 are connected to each other, and the connection node is another output node 1b of the single-phase rectifier circuit 10. An output terminal of the single-phase AC power supply 20 is connected to a connection node 10c of the first and second diodes 11 and 12, and another output terminal of the single-phase AC power supply 20 is connected to a connection node 1d of the third and fourth diodes 13 and 14.

The inverter circuit 3 converts the output voltage of the power supply 1 into a three-phase AC voltage on the basis of a drive signal outputted from the inverter control unit 4, and supplies the voltage to the three-phase brushless motor 2.

The inverter circuit 3 includes first and second switching elements 31 and 32 which are connected in series, and third and fourth switching elements 35 and 36 which are connected in series. One ends of the first, third, and fifth switching elements 31, 33, and 35 are connected to each other, and the connection node is connected to the output node 1a of the power supply 1. One ends of the second, fourth, and sixth switching elements 32, 34, and 36 are connected to each other, and the connection node is connected to the output node 1b of the power supply 1. First to sixth diodes 41 to 46 are connected in inverse-parallel to the first to sixth switching elements 31 to 36, respectively. A connection node 3a of the first and second switching elements 31 and 32 is a first output node of the inverter circuit 3, a connection node 3b of the third and fourth switching elements 33 and 34 is a second output node of the inverter circuit 3, and a connection node 3c of the fifth and sixth switching elements 35 and 36 is a third output node of the inverter circuit 3. The first to third output nodes 3a to 3c of the inverter circuit 3 are respectively connected to the input nodes corresponding to the respective phases of the three-phase input of the brushless motor 2. The respective switching elements are IGBT (Insulated Gate type Bipolar Transistors). However, the switching elements may be power transistors or MOSFETs.

While in this first embodiment the inverter circuit 3 is of a three-phase full bridge structure, the inverter circuit 3 may be of any structure as long as it can output a three-phase AC. For example, in the inverter circuit 3, a portion corresponding to one phase of the three-phase AC output may be constituted using a capacitor. Alternatively, snubber circuits may be added to the respective switching elements.

The power supply 1 is not restricted to the above-mentioned one which outputs the voltage obtained by rectifying the output voltage of the AC power supply using the rectifier circuit. The power supply 1 may have a small-capacitance capacitor at the output end so as to smooth the output voltage of the rectifier circuit. Further, the power supply that outputs such variable voltage is not restricted to one having an AC voltage, and it may be a battery or the like to which a load is connected in addition to an inverter.

The inverter control unit 4 controls the inverter circuit 3 so as to drive the brushless motor 2 at an rpm desired by a user, and the inverter control unit 4 comprises a rotor position estimation unit 5 and a drive signal generation unit 6.

The rotor position estimation unit 5 estimates the phase of the rotor on the basis of a current I that is supplied from the inverter circuit 3 to the brushless motor 2. The position of the rotor may be estimated by utilizing an induced voltage of the brushless motor 2, or it may be estimated on the basis of a detection output of a position sensor that is attached to the brushless motor 2.

The drive signal generation unit 6 generates a drive signal Sg to be applied to the inverter circuit 3 on the basis of the rotor phase $\theta$ estimated by the rotor position estimation unit 5 and the command rpm $\omega 0$ indicated by the external command signal, so that a voltage having a phase according to the estimated phase $\theta$ and an amplitude according to the command rpm $\omega 0$ is supplied from the inverter circuit 3 to the brushless motor 2, and outputs the drive signal Sg to the inverter circuit 3. Although the command rpm $\omega 0$ varies according to the performance required of the brushless motor 2, a predetermined range of rpms, i.e., a specific rpm for which a latitude is allowed, is not employed as the command rpm $\omega 0$.

In the inverter circuit 3, the amplitude value of the voltage to be applied to the brushless motor 2 is controlled on the basis of the drive signal Sg so that a difference between an actual rpm $\omega$ derived from the estimated phase $\theta$ and the command rpm $\omega 0$ is reduced, and the frequency of the output current of the inverter circuit 3 is not fixed to a specific value. The specific value may be the frequency of the DC power supply 1, the natural frequency of the brushless motor 2 to be driven, or the natural frequency of a load to which the brushless motor 2 is connected.

Further, as a method for adjusting the amplitude so that the frequency of the output current of the inverter circuit 3 is not fixed to a specific value, it is considered that a predetermined range of rpms, i.e., the above-mentioned frequency to be avoided having a latitude, is not adopted as the command rpm $\omega 0$.

Next, the operation will be described.

In the motor driving apparatus 100, when the drive signal Sg is generated by the inverter control unit 4 and inputted to the inverter circuit 3, a driving voltage is supplied from the inverter circuit 3 which receives the voltage from the power supply 1, to the brushless motor 2. That is, in the inverter circuit 3, the drive signal Sg is applied as a gate signal to the respective switching elements 31 to 36, whereby the switching elements 31 to 36 are turned on and off. Thereby, the output voltage of the power supply 1 is converted into a three-phase AC voltage, and the three-phase AC voltage is output to the brushless motor 2. Then, the brushless motor 2 is driven by the three-phase AC voltage.

Hereinafter, the operations of the rotor position estimation unit 5 and the drive signal generation unit 6 in the inverter control unit 4 will be described.

In the rotor position estimation unit 5, the phase of the rotor is estimated from the current I supplied from the inverter circuit 3 to the brushless motor 2.

In the drive signal generation unit 6, a drive signal Sg to be output to the inverter 3 is generated on the basis of the command rpm $\omega 0$ indicated by the external command signal and the rotor phase $\theta$ estimated by the rotor position estimation unit 5. At this time, a duty ratio of the drive signal Sg is determined so that a difference between the actual rpm $\omega$ which is derived from the estimated phase $\theta$ and the command rpm $\omega 0$ is minimized, and a voltage having an amplitude value corresponding to the determined duty ratio is supplied from the inverter circuit 3 to the brushless motor 2.

More specifically, in the drive signal generation unit 6, the actual rpm $\omega$ is obtained by differentiating the estimated rotor phase $\theta$ that is obtained by the rotor position estimation unit 5, and the actual rpm $\omega$ is compared with the command rpm $\omega 0$. When the actual rpm $\omega$ is smaller than the command rpm $\omega 0$, the duty ratio of the drive signal Sg is adjusted so as to increase the amplitude value of the voltage supplied to the brushless motor 2. On the other hand, when the actual rpm $\omega$ is larger than the command rpm $\omega 0$, the duty ratio of the drive signal Sg is adjusted so as to decrease the amplitude value of the voltage supplied to the brushless motor 2. A predetermined range of rpms, i.e., a specific rpm having a latitude, is not adopted as the command rpm $\omega 0$. When the actual rpm $\omega$ is equal to the command rpm $\omega 0$, the duty ratio of the drive signal Sg is not changed. The adjustment of the duty ratio is repeated at regular intervals. Thereby, the frequency of the output current of the inverter circuit 3 is prevented from being fixed to the specific value.

As described above, the motor driving apparatus according to the first embodiment is provided with the inverter circuit 3 for converting the output voltage from the power supply 1 into a driving voltage and outputting the driving voltage to the brushless motor 2, and the inverter control unit 4 for controlling the amplitude value of the voltage supplied from the inverter circuit 3 to the brushless motor 2 so as to minimize the difference between the command rpm $\omega 0$ indicated by the external command signal and the actual rpm $\omega$ derived from the estimated phase $\theta$ of the rotor, whereby the command rpm $\omega 0$ is controlled so as not to be restricted to a predetermined range of rpms. Therefore, the brushless motor 2 is prevented from being driven at an rpm that makes the operation of the motor 2 unstable, resulting in stable drive control for the brushless motor 2. As a result, it is possible to realize a motor driving apparatus satisfying the IEC harmonic standards, which is able to prevent noise and vibration from occurring or the harmonic component of the motor driving current from appearing at the input end of the inverter circuit 3, even when a voltage pulse of a predetermined frequency occurs at the input end of the inverter circuit 3.

While in this first embodiment the DC power supply 1 comprises the single-phase AC power supply 20 and the single-phase rectifier circuit 10 for rectifying the output of the power supply 20, the DC power supply 1 is not restricted thereto, and it may comprises a three-phase AC power supply and a three-phase rectifier circuit for rectifying the output of the power supply.

Figure 1B:
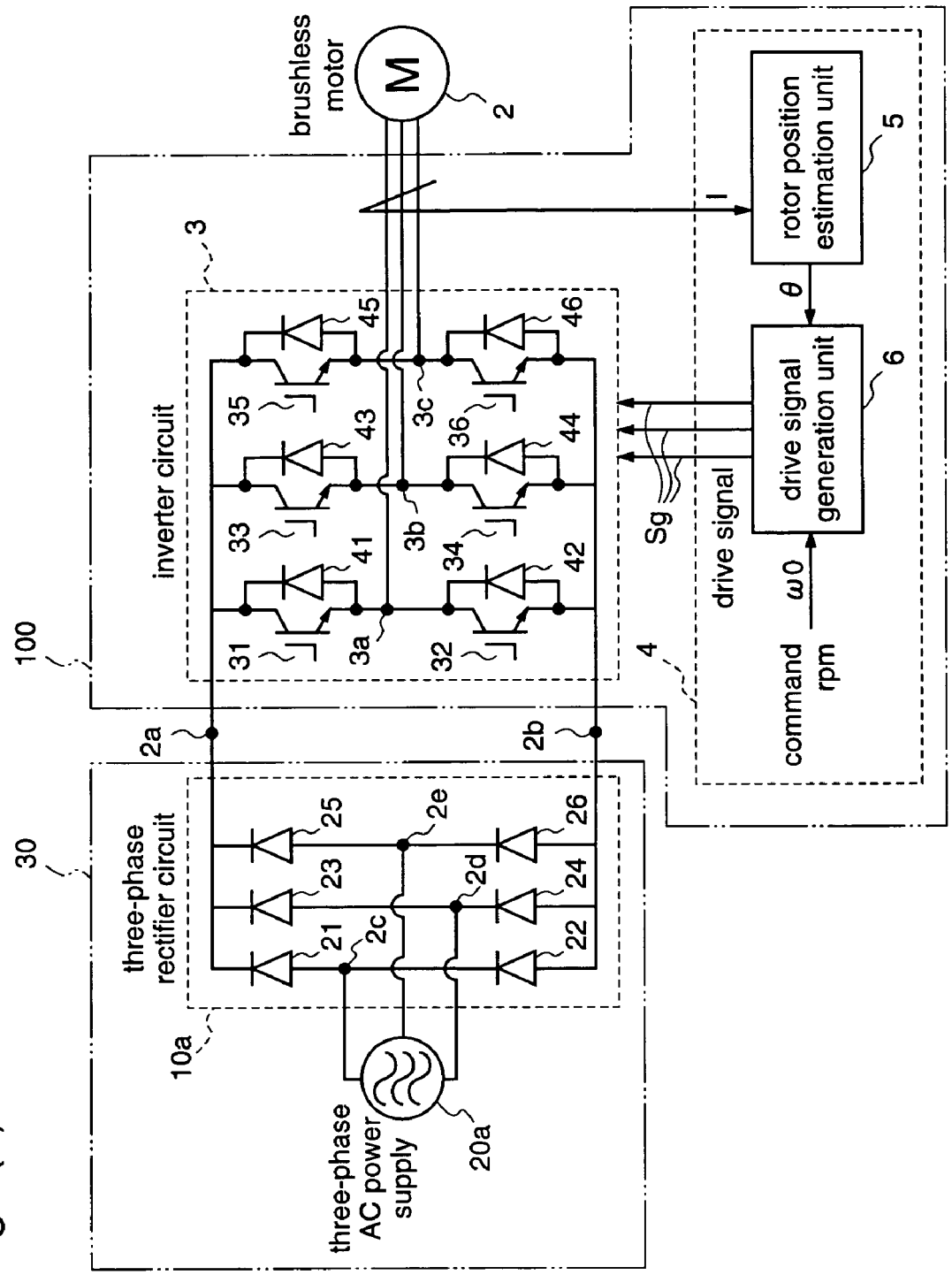
FIG. 1(b) is a block diagram for explaining another example of a power supply that supplies a voltage to the motor driving apparatus 100 according to the first embodiment.

FIG. 1(b) is a diagram for explaining an AC power supply of a motor driving apparatus, which comprises a three-phase AC power supply and a three-phase rectifier circuit.

The motor driving apparatus 100 is identical to that of the first embodiment and a three-phase AC power supply 20a as a component of a DC power supply (hereinafter referred to simply as a power supply) 30 of the motor driving apparatus has three output terminals, and the phases of voltages outputted from the respective output terminals are 120° shifted from each other.

Further, a three-phase rectifier circuit 10a as a component of the power supply 30 has first and second diodes 21 and 21 which are connected in series, third and fourth diodes 23 and 24 which are connected in series, and fifth and sixth diodes which are connected in series. The cathodes of the first, third, and fifth diodes 21, 23, and 25 are connected to each other, and the connection node is an output node 2a of the three-phase rectifier circuit 10a. The anodes of the second, fourth, and sixth diodes 22, 24, and 26 are connected to each other, and the connection node is the other output node 2b of the three-phase rectifier circuit 10a. Further, a first output terminal of the three-phase AC power supply 20a is connected to a connection node 2c of the first and second diodes 21 and 22, a second output terminal of the three-phase AC power supply 20a is connected to a connection node 2d of the third and fourth diodes 23 and 24, and a third output terminal of the three-phase AC power supply 20a is connected to a connection node 2e of the fifth and sixth diodes 25 and 26.

The connection node of the first, third, and fifth switching elements 31, 33, and 35 as components of the inverter circuit 3 of the motor driving apparatus 100 is connected to the one output node of the three-phase rectifier circuit 10a, and the connection node of the second, fourth, and sixth switching elements 32, 34, and 36 as components of the inverter circuit 3 is connected to the other output node 2b of the three-phase rectifier circuit 10a.

As described above, even when the power supply for supplying a voltage to the motor driving apparatus 100 is the power supply 30 comprising the three-phase AC power supply 20a and the three-phase rectifier circuit 10a instead of the power supply 1 comprising the single-phase AC power supply 20 and the single-phase rectifier circuit 10, the same effects as those described for the first embodiment can be achieved.

Furthermore, the AC power supply according to the first embodiment is not restricted to those using the above-mentioned AC supplies, and a power supply using a DC supply such as a battery may be employed. Also in this case, the same effects as those obtained when using the AC supply can be expected.

For example, when a plurality of motors are driven with a single DC power supply, the DC voltage outputted from the battery varies depending on the rpm of a main motor that requires a large current, and therefore, a sub motor that is driven by a small current is somewhat affected by the variation in the DC voltage. Also in this case, unstable driving of the sub motor can be resolved by preventing the sub motor from driving at an rpm in the vicinity of the rpm of the main motor or an rpm that is an integral multiple of the rpm of the main motor.

Embodiment 2

Figure 2:
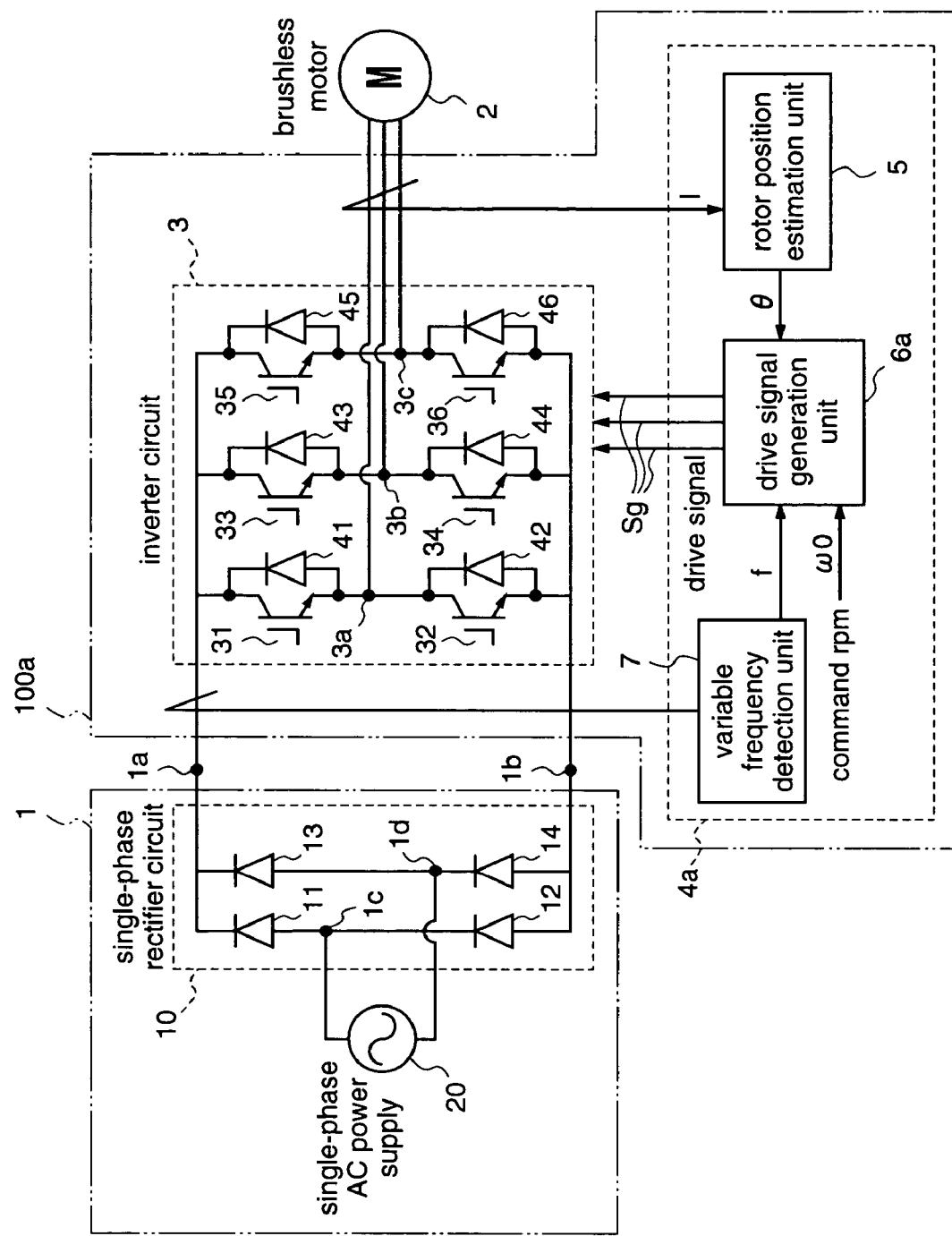
FIG. 2 is a block diagram for explaining a motor driving apparatus according to a second embodiment of the present invention.

FIG. 2 is a block diagram for explaining a motor driving apparatus 100a according to a second embodiment of the present invention.

The motor driving apparatus 100a according to the second embodiment drives the brushless motor 2 so that the rpm of the brushless motor 2 is not fixed to a variable frequency f of the output voltage of the power supply 1. Further, in this second embodiment, the command rpm ω varies according to the performance required of the brushless motor 2, and there is no restriction such that a predetermined range of rpms is not adopted as the command rpm ω0 as in the first embodiment. The other constituents of the motor driving apparatus 100a are identical to those of the motor driving apparatus 100 according to the first embodiment. Also in this second embodiment, the brushless motor 2 is driven at an arbitrary rpm that matches the frequency of the AC current supplied to the brushless motor 2.

That is, the motor driving apparatus 100a according to the second embodiment is provided with an inverter circuit 3 that receives a voltage supplied from the power supply 1 and applies a driving voltage to the brushless motor 2, and an inverter control unit 4a for controlling the inverter circuit 3. The power supply 1 and the inverter circuit 3 are identical to those of the motor driving apparatus 100 according to the first embodiment.

The inverter control unit 4a supplies a driving signal Sg to the inverter circuit 3 so as to drive the brushless motor 2 at an rpm desired by a user, and the inverter control unit 4a comprises a drive signal generation unit 6a and a variable frequency detection unit 7.

The rotor position estimation unit 5 estimates the rotor position from a current I supplied to the brushless motor 2.

The variable frequency detection unit 7 detects a variable frequency f of the output voltage of the power supply 1, and outputs a frequency signal indicating the variable frequency f. To be specific, the output voltage of the power supply 1 is detected, and the variable frequency f of the output voltage is calculated from a time interval between different polarity change points of the detected voltage or from a cross timing with respect to a predetermined value of the detected voltage.

While in this second embodiment the variable frequency detection unit 7 detects the variable frequency from the output voltage of the power supply 1, since the variable frequency of the output voltage can be previously estimated when an output of a commercial AC power supply is rectified to be used as the output voltage of the power supply 1 or when the frequency of the power consumed by another connected to the power supply 1 has already been known, the variable frequency f of the output voltage can be determined without detecting the output voltage of the power supply 1.

The drive signal generation unit 6a receives the rotor phase θ estimated by the rotor position estimation unit 5, the command rpm ω0 indicated by the external command signal, and the variable frequency f of the power supply output voltage detected by the variable frequency detection unit 7, and controls the inverter circuit 3 with the drive signal Sg so that a voltage having a phase according to the estimated rotor phase θ from the inverter circuit 3 and an amplitude according to the command rpm ω0 is applied to the brushless motor 2.

At this time, the duty ratio of the drive signal Sg, i.e., the amplitude value of the voltage applied to the brushless motor 2, is adjusted so that the difference between the actual rpm ω derived from the estimated rotor phase θ (i.e., the frequency of the output current of the inverter circuit 3) and the command rpm ω0 indicated by the external command signal is minimized, and the frequency of the output current of the inverter circuit 3 is not fixed to a multiple of the variable frequency f of the power supply output voltage.

Next, the operation will be described.

In the motor driving apparatus 100a, as in the motor driving apparatus 100 according to the first embodiment, the inverter circuit 3 converts the output voltage of the power supply 1 into a three-phase AC voltage, and the brushless motor 2 is driven by the three-phase AC voltage.

At this time, the inverter control unit 4a generates a pulse signal as the drive signal Sg, on the basis of the command rpm ω0 indicated by the external command signal, the output voltage of the power supply 1, and the current I supplied to the brushless motor 2.

Hereinafter, the operations of the components 5, 6a, and 7 of the inverter control unit 4a will be described.

The rotor position estimation unit 5 estimates the rotor position θ on the basis of the current I supplied from the inverter circuit 3 to the brushless motor 2.

The variable frequency detection unit 7 detects the variable frequency f of the output voltage of the power supply 1.

The drive signal generation unit 6a generates a drive signal Sg to be output to the inverter circuit 3, on the basis of the command rpm ω0 that is indicated by the external command signal and varies according to the performance required of the brushless motor 2, the rotor phase θ estimated by the rotor position estimation unit 5, and the variable frequency f detected by the variable frequency detection unit 7.

At this time, the duty ratio of the drive signal Sg, i.e., the amplitude value of the voltage supplied from the inverter circuit 3 to the brushless motor 2, is adjusted so that a difference between the actual rpm ω derived from the estimated rotor phase θ (i.e., the frequency of the output current of the inverter circuit 3) and the command rpm ω0 indicated by the external command signal is minimized, and the frequency of the output current of the inverter circuit 3 is not fixed to a multiple of the variable frequency f of the power supply output voltage. That is, in this second embodiment, the operation of adjusting the duty ratio of the drive signal Sg on the basis of the difference between the actual rpm ω and the command rpm ω0 is carried out in the same manner as described for the first embodiment, and furthermore, the duty ratio of the drive signal Sg is adjusted so that the actual rpm ω is not fixed to the command rpm ω0 when the command rpm ω0 matches the variable frequency f.

Then, in the inverter circuit 3, the respective switching elements are turned on/off according to the drive signal Sg, whereby the output voltage of the power supply 1 is converted into a three-phase AC voltage, and the three-phase AC voltage is supplied to the brushless motor 2.

Then, the brushless motor 2 is driven so that the difference between the actual rpm ω and the command rpm ω0 is minimized and the rpm of the brushless motor 2 is not fixed to the detected variable frequency.

As described above, the motor driving apparatus 100a according to the second embodiment is provided with the inverter circuit 3 for converting the output voltage of the power supply 1 into a three-phase AC voltage to be applied to the brushless motor 2; the detector 7 for detecting the variable frequency f of the output voltage of the power supply 1; and the inverter control unit 4a for controlling the amplitude value of the voltage to be supplied from the inverter circuit 3 to the brushless motor 2, on the basis of the command rpm ω0 indicated by the external command signal, the estimated rotor phase θ, and the detected variable frequency f, so that the difference between the command rpm ω0 and the actual rpm ω is minimized and the frequency of the output current of the inverter circuit 3 is not fixed to the variable frequency f. Therefore, it is possible to prevent unpleasant nose and vibration from occurring due to a beat phenomenon that is caused by the current supplied to the brushless motor 2 and the variable frequency component of the power supply output voltage, resulting in stable drive control for the brushless motor 2.

In the second embodiment, the drive signal generation unit 6a adjusts the duty ratio of the drive signal Sg of the inverter circuit 3 so that the difference between the actual rpm ω and the command rpm ω0 is minimized, and the frequency of the output current of the inverter circuit 3 is not fixed to the variable frequency f of the power supply output voltage. However, the drive signal generation unit 6a may adjust the duty ratio of the drive signal Sg so that the frequency of the output current of the inverter 3 is not fixed to a multiple of ⅙ of the variable frequency f of the power supply output voltage.

In this case, the frequency of the output current of the inverter circuit 3 is not maintained at a multiple of ⅙ of the variable frequency of the power supply output voltage, thereby avoiding a harmonic current exceeding the IEC standard value from occurring due to an n-th order harmonic of the variable frequency of the power supply output voltage.

Hereinafter, the effect will be described briefly.

When the frequency of the power supply output voltage varies during driving of the three-phase brushless motor 2, a frequency component that is 6 times as high as the frequency of the current supplied to the brushless motor 2 is modulated by the n-th order harmonic of the variable frequency of the power supply output voltage, and the harmonic component is introduced to the driving current. Since the harmonic component introduced to the driving current is equal to an m-th order harmonic component of the power supply output voltage, it is superposed on the originally existing m-th order harmonic of the variable frequency of the power supply output voltage, whereby a harmonic current that exceeds the IEC standard value might occur.

As described above, since the drive signal generation unit 6a adjusts the duty ratio of the drive signal Sg so that the actual rpm ω, i.e., the frequency of the output current of the inverter circuit 3, is not fixed to a multiple of ⅙ of the variable frequency f of the power supply output voltage, it is avoided that a component equal to the m-th order harmonic component of the power supply output voltage is introduced into the driving current, thereby avoiding occurrence of a harmonic current that exceeds the IEC standard value.

Embodiment 3

Figure 3:
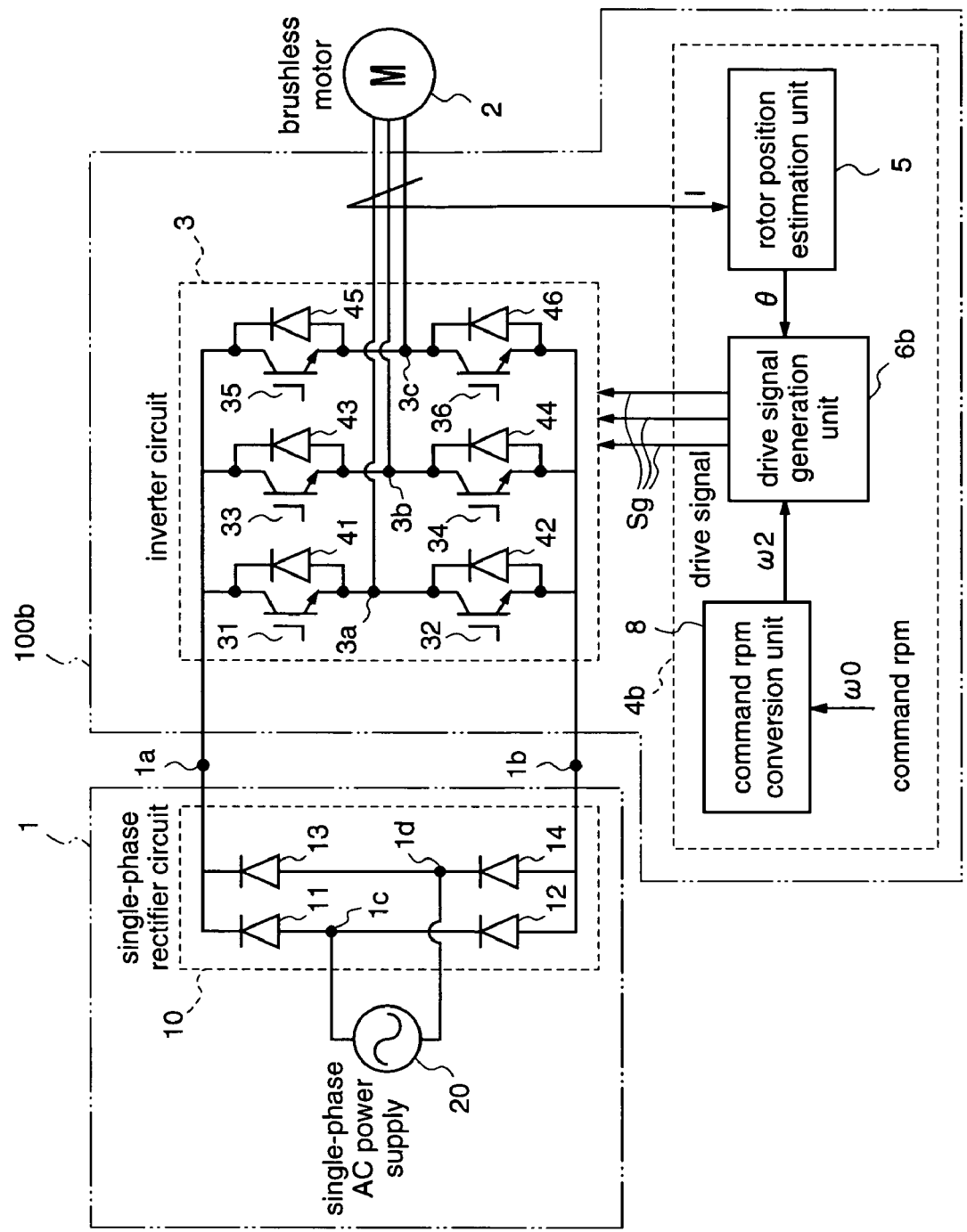
FIG. 3 is a block diagram for explaining a motor driving apparatus according to a third embodiment of the present invention.

FIG. 3 is a block diagram for explaining a motor driving apparatus 100b according to a third embodiment of the present invention.

The motor driving apparatus 100b according to the third embodiment drives the brushless motor 2 so that the rpm thereof is continuously varied. The other construction of the motor driving apparatus 100b is identical to that of the first embodiment. Also in this third embodiment, the brushless motor 2 is always driven at an arbitrary rpm that matches the frequency of the AC current supplied to the brushless motor 2.

That is, the motor driving apparatus 100b comprises an inverter circuit 3 for supplying a driving voltage to the brushless motor 2, and an inverter control unit 4b for controlling the inverter circuit 3. The power supply 1 and the inverter circuit 3 are identical to those described for the first embodiment.

The inverter control unit 4b supplies a drive signal Sg to the inverter circuit 3 so as to drive the brushless motor 2 at an rpm desired by a user, and the inverter control unit 4b comprises a rotor position estimation unit 5, a drive signal generation unit 6b, and a command rpm conversion unit 8.

The rotor position estimation unit 5 estimates the rotor position from the current I supplied to the brushless motor 2, as described for the first embodiment.

The command rpm conversion unit 8 converts the command rpm $\omega 0$ indicated by an external command signal into a command rpm $\omega 2$ that continuously varies with the command rpm $\omega 0$ as a reference value. As a specific conversion method, a constant degree of increase in the command rpm $\omega 0$ and a constant degree of decrease in the command rpm $\omega 0$ are repeated at regular intervals.

The drive signal generation unit 6b receives the rotor phase $\theta$ estimated by the rotor position estimation unit 5, and the converted command rpm $\omega 0$ outputted from the command rpm conversion unit 8, and generates a pulse signal as a drive signal Sg for the inverter circuit 3 so that a voltage having a phase according to the estimated rotor phase $\theta$ and an amplitude according to the command rpm $\omega 2$ is supplied from the inverter circuit 3 to the brushless motor 2, and then outputs the pulse signal to the inverter circuit 3. At this time, the duty ratio of the drive signal Sg (pulse signal) to the inverter circuit 3 is adjusted so that a difference between the actual rpm $\omega$ derived from the estimated rotor phase $\theta$ and the converted rpm $\omega 2$ is minimized.

Next, the operation will be described.

In the motor driving apparatus 100b, as in the motor driving apparatus 100 according to the first embodiment, the inverter circuit 3 converts the output voltage of the power supply 1 into a three-phase AC voltage, and the brushless motor 2 is driven by the three-phase AC voltage.

At this time, the command rpm conversion unit 8 converts the command rpm $\omega$ indicated by the external command signal into the command rpm $\omega 2$ that continuously varies with the command rpm $\omega 0$ as a reference. The rotor position estimation unit 5 estimates the rotor position $\theta$ on the basis of the current I supplied from the inverter circuit 3 to the brushless motor 2. The drive signal generation unit 6b generates a drive signal Sg for the inverter circuit 3, on the basis of the converted command rpm $\omega 2$ and the estimated rotor phase $\theta$. That is, in this third embodiment, the duty ratio of the drive signal Sg is adjusted on the basis of the difference between the actual rpm $\omega$ and the converted command rpm $\omega 2$ as in the first embodiment, whereby the amplitude value of the voltage supplied from the inverter circuit 3 to the brushless motor 2 is controlled so that the difference between the converted command rpm $\omega 2$ and the actual rpm $\omega$ obtained from the estimated phase is minimized. In this third embodiment, however, adjustment of the duty ratio of the drive signal Sg is repeated at intervals shorter than the intervals of variation of the converted command rpm $\omega 2$.

As described above, the motor driving apparatus 100b according to the third embodiment is provided with the inverter circuit 3 for converting the output voltage of the power supply 1 into a three-phase AC voltage to be applied to the brushless motor 2; the command rpm conversion unit 8 for converting the command rpm $\omega 0$ indicated by the external command signal into the command rpm $\omega 2$ that continuously varies with the command rpm $\omega 0$ as a reference; and the inverter control unit 4b for controlling the amplitude value of the voltage supplied from the inverter circuit 3 to the brushless motor 2 so as to minimize the difference between the converted command rpm $\omega 2$ and the actual rpm $\omega$ obtained from the estimated phase. Therefore, the frequency of the driving current of the brushless motor 2 continuously varies at a constant width, thereby dispersing the frequency spectrum of the current that is obtained by superposing the n-th order harmonic component of the variable frequency of the power supply output voltage on the driving current of the brushless motor. Thereby, a harmonic current that exceeds the IEC standard value is prevented from occurring during driving of the brushless motor 2, resulting in stable drive control for the brushless motor 2.

In the third embodiment, the command rpm conversion unit 8 repeats a constant degree of increase and decrease of the command rpm $\omega 0$ at regular intervals. However, the command rpm conversion unit 8 may change, at random, the amount of change in the command rpm $\omega 0$, or the cycle of change in the command rpm $\omega 0$, or both of the amount of change and the cycle.

In this case, it is possible to prevent noise and vibration from occurring due to the change in the command rpm by the command rpm conversion unit 8.

Further, while in this third embodiment the amount of change in the driving frequency of the brushless motor and the cycle of change in the driving frequency are constant, either the amount of change in the driving frequency or the cycle of change in the driving frequency may be varied according to the circumstances.

Figure 4:
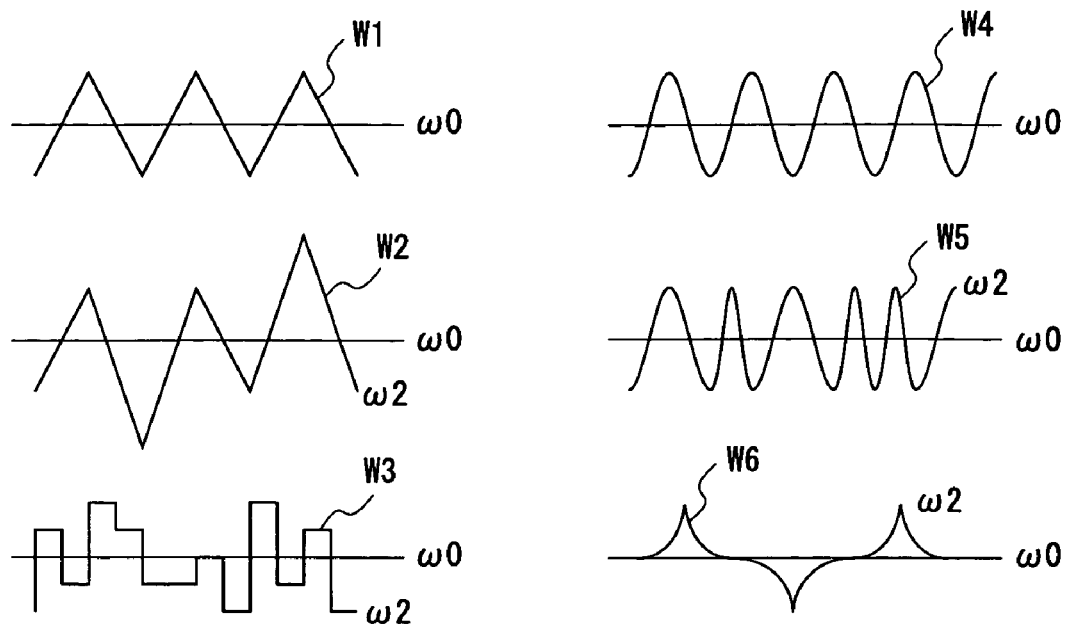
FIG. 4 is a diagram illustrating waveforms for explaining an example of operation of a command rpm conversion unit included in the motor driving apparatus according to the third embodiment.

FIG. 4 is a diagram illustrating patterns of variations in the command rpm $\omega 2$ that continuously varies.

In a variation pattern W1 of the command rpm $\omega 2$, the converted command rpm $\omega 2$ varies in a triangle wave having a constant amplitude and a constant cycle, with the command rpm $\omega 0$ indicated by the external command signal as a reference.

In a variation pattern W2 of the command rpm $\omega 2$, the converted command rpm $\omega 2$ varies in a triangle wave having an inconstant amplitude and a constant cycle, with the command rpm $\omega 0$ indicated by the external command signal as a reference.

In a variation pattern W3 of the command rpm $\omega 2$, the converted command rpm $\omega 2$ varies in a rectangle wave having an inconstant amplitude and an inconstant cycle, with the command rpm $\omega 0$ indicated by the external command signal as a reference.

In a variation pattern W4 of the command rpm $\omega 2$, the converted command rpm $\omega 2$ varies in a sinusoidal wave with the command rpm $\omega 0$ indicated by the external command signal as a reference.

In a variation pattern W5 of the command rpm $\omega 2$, the converted command rpm $\omega 2$ varies in a sinusoidal wave having an inconstant cycle, with the command rpm $\omega 0$ indicated by the external command signal as a reference.

In a variation pattern W6 of the command rpm $\omega 2$, the converted command rpm $\omega 2$ varies in a sinusoidal wave with the command rpm $\omega 0$ indicated by the external command signal as a reference, in which monotone increase and monotone decrease are alternately repeated so that the change is smaller as getting closer to the reference value.

When the converted command rpm ω2 varies in the patterns described above, the operation of the brushless motor 2 can be stabilized while suppressing noise and vibration caused by the change in the driving frequency of the brushless motor 2. The variations in the driving frequency are not restricted to the six patterns shown in FIG. 4.

Furthermore, in order to avoid vibration that causes audible noise, the range of variation in the continuously varying command rpm ω2 should be set at 20 Hz or lower that is an audible range, resulting in further reduction in noise. Likewise, the amount of change in the driving frequency may be set at 20 Hz or lower to achieve further reduction in noise.

Embodiment 4

Figure 5:
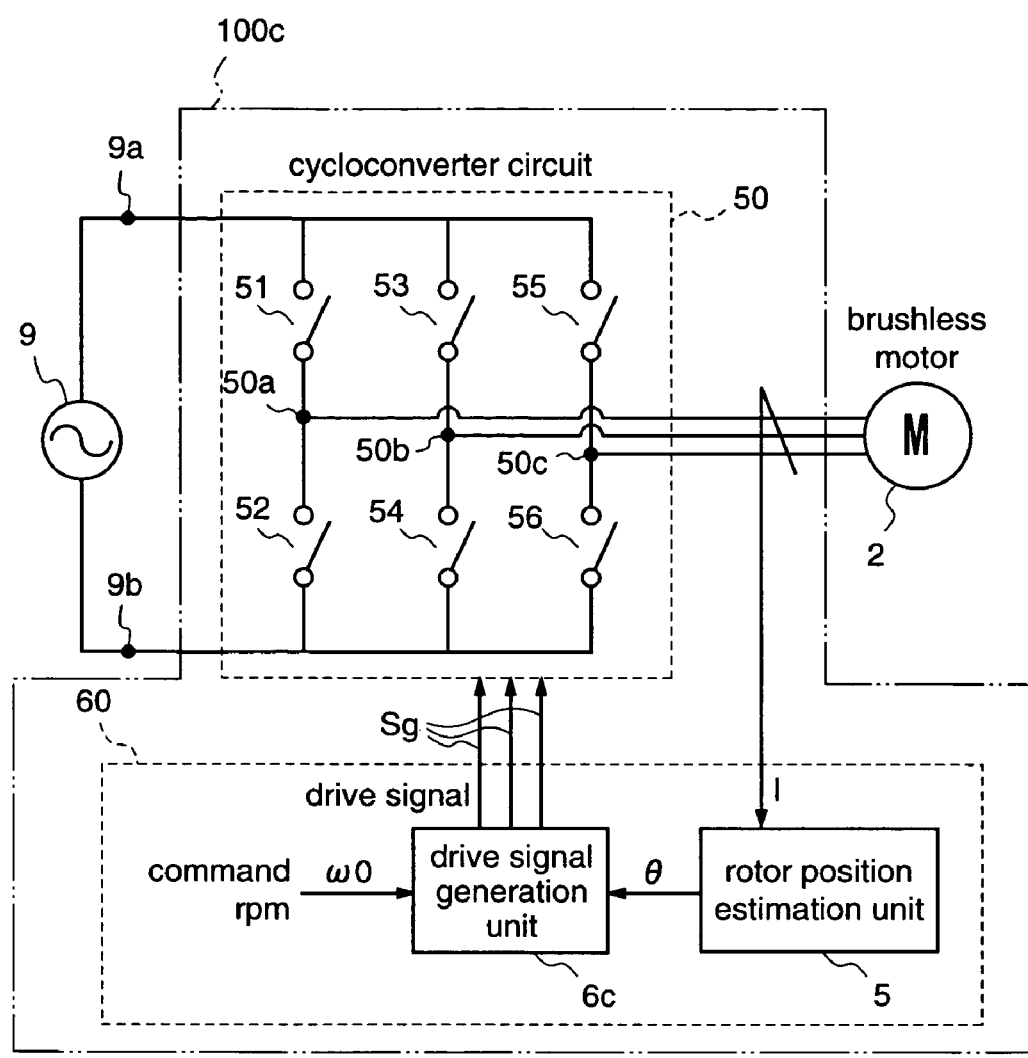
FIG. 5 is a block diagram for explaining a motor driving apparatus according to a fourth embodiment of the present invention.

FIG. 5 is a block diagram for explaining a motor driving apparatus 100c according to a fourth embodiment of the present invention.

The motor driving apparatus 100c according to the fourth embodiment has an input connected to a single-phase AC power supply 9, and drives the brushless motor 2 at an arbitrary rpm by a three-phase AC output. Also in this fourth embodiment, the brushless motor 2 is continuously driven at an arbitrary rpm that matches the frequency of an AC current supplied to the brushless motor 2.

The motor driving apparatus 100c is provided with a cycloconverter circuit 50 for converting an AC voltage outputted from the single-phase AC power supply 9 into a three-phase AC voltage to be output to the brushless motor 2, and a cycloconverter control unit 60 for controlling the cycloconverter circuit 50 on the basis of an rpm command signal supplied from the outside.

The cycloconverter circuit 50 has first and second open/close switches 51 and 52 which are connected in series, third and fourth open/close switches 53 and 54 which are connected in series, and fifth and sixth open/close switches 55 and 56 which are connected in series. One ends of the first, third, and fifth open/close switches 51, 53, and 55 are connected to each other, and the connection node is connected to an output node 9a of the AC power supply 9. One ends of the second, fourth, and sixth open/close switches 52, 54, and 56 are connected to each other, and the connection node is connected to the other output node 9b of the AC power supply 9. A connection node 50a of the first and second open/close switches 51 and 52 is a first output node of the cycloconverter circuit 50, a connection node 50b of the third and fourth open/close switches 53 and 54 is a second output node of the cycloconverter circuit 50, and a connection node 50c of the fifth and sixth open/close switches 55 and 56 is a third output node of the cycloconverter circuit 50. The first to third output nodes 50a to 50c of the cycloconverter circuit 50 are respectively connected to the input nodes corresponding to the respective phases of the three-phase input of the brushless motor 2. While in this fourth embodiment the single-phase AC power supply and the corresponding cycloconverter circuit are shown as a power supply and a power conversion circuit, the power supply may be a three-phase AC power supply and the power conversion circuit may be a cycloconverter circuit corresponding to the three-phase AC power supply.

The cycloconverter control unit 60 controls the cycloconverter circuit 50 so as to drive the brushless motor 2 at an rpm desired by a user, and the cycloconverter control unit 60 comprises a rotor position estimation unit 5 and a drive signal generation unit 6c.

The rotor position estimation unit 5 estimates the rotor position from the current I supplied to the brushless motor 2 as in the first embodiment.

The drive signal generation unit 6c creates a drive signal Sg to be applied to the cycloconverter circuit 50 on the basis of the rotor phase θ estimated by the rotor position estimation unit 5 and the command rpm ω0 indicated by the external command signal, so that a voltage having a phase according to the estimated phase θ and an amplitude according to the command rpm ω0 is supplied from the cycloconverter circuit 50 to the brushless motor 2, and outputs the drive signal Sg to the cycloconverter circuit 50.

At this time, in the cycloconverter circuit 50, the amplitude value of the voltage to be applied to the brushless motor 2 is adjusted so that a difference between an actual rpm ω derived from the estimated phase θ and the command rpm ω0 is minimized, and the frequency of the output current of the cycloconverter circuit 50 is not fixed to a specific value. The specific value may be the frequency of the AC power supply, the natural frequency of the brushless motor 2 to be driven, or the natural frequency of a load to which the brushless motor 2 is connected.

Further, as a method for adjusting the amplitude so that the frequency of the output current of the inverter circuit 3 is not fixed to a specific value, it can be considered that a predetermined range of frequencies, that is, a frequency to be avoided to which a latitude is allowed, is not adopted as the command rpm ω0.

Next, the operation will be described.

In the motor driving apparatus 100c, the drive signal Sg for the cycloconverter circuit 50 is generated by the cycloconverter control unit 60, and the drive signal Sg is input to the cycloconverter circuit 50. Then, in the cycloconverter circuit 50, the respective switches 51 to 56 are opened or closed by the drive signal Sg. Thereby, in the cycloconverter circuit 50, the output voltage of the single-phase AC power supply 9 is converted into a three-phase AC voltage, and the three-phase AC voltage is output to the brushless motor 2. The brushless motor 2 is driven by the three-phase AC voltage.

Hereinafter, the operations of the respective components 5 and 6c of the cycloconverter control unit 60 will be described.

In the rotor position estimation unit 5, the phase of the rotor is estimated from the current I that is supplied from the cycloconverter circuit 50 to the brushless motor 2.

In the drive signal generation unit 6c, a drive signal Sg to be output to the cycloconverter circuit 50 is generated on the basis of the command rpm ω0 indicated by the external command signal and the rotor phase θ estimated by the rotor position estimation unit 5. The command rpm ω0 is out of a predetermined range of rpms, i.e., a specific rpm allowed to have a latitude. Further, the duty ratio of the drive signal Sg as a pulse signal is determined so as to minimize a difference between the actual rpm ω which is derived from the estimated phase θ and the command rpm ω0, and a voltage having an amplitude value corresponding to the determined duty ratio is supplied from the cycloconverter circuit 50 to the brushless motor 2. Thereby, the output current of the cycloconverter circuit 50 is not fixed to the specific value.

The operation of generating the drive signal by the drive signal generation unit 6c is identical to the operation of generating the drive signal by the drive signal generation unit 6 according to the first embodiment.

As described above, the motor driving apparatus 100c according to the fourth embodiment is provided with the cycloconverter circuit 50 which converts the output voltage of the single-phase AC power supply 9 into a three-phase AC voltage, and outputs the voltage to the brushless motor 2, and the cycloconverter control unit 60 which controls the amplitude value of the voltage to be supplied from the cycloconverter circuit 50 to the brushless motor 2 so that a difference between the command rpm ω0 which is set by the external command signal and the actual rpm ω which is derived from the estimated phase θ is minimized, whereby the command rpm ω0 is controlled so as to be out of a predetermined range of rpms. Therefore, the brushless motor 2 can be prevented from being driven at an rpm which makes the operation of the brushless motor 2 unstable, resulting in stable drive control for the brushless motor 2. As a result, it is possible to obtain a motor driving apparatus satisfying the IEC harmonic standards, which prevents noise and vibration from occurring, and prevents a harmonic component of the motor driving current from appearing at the input end of the cycloconverter circuit 50, even when a voltage fluctuation of a constant frequency occurs at the input end of the cycloconverter circuit 50.

In this fourth embodiment, the cycloconverter control unit 60 controls the cycloconverter circuit 50 that supplies the driving voltage to the cycloconverter circuit 50, on the basis of the command rpm ω0 that does not take a value within a predetermined range, and the rotor phase θ estimated from the driving current I of the brushless motor 2, like the converter control unit 4 according to the first embodiment. However, the cycloconverter control unit 60 is not restricted thereto.

For example, the cycloconverter control unit 60 may have a frequency detection unit for detecting the frequency of the output voltage of the DC power supply 1, thereby to control the cycloconverter circuit 50 so that the frequency of the driving voltage of the brushless motor 2 is not fixed to a multiple of the detected frequency of the output voltage of the AC power supply or to a multiple of ⅙ of the detected frequency of the output voltage of the AC power supply, as described for the second embodiment. In this case, it is possible to prevent unpleasant noise and vibration from occurring due to a beam phenomenon that is caused by the driving current of the brushless motor 2 and the variable frequency component of the power supply output voltage, and prevent a harmonic current that exceeds the IEC standard value.

Furthermore, the cycloconverter control unit 60 may have a command rpm conversion unit 8 for converting the command rpm ω0 indicated by the external command signal into a command rpm ω2 that continuously changes with the command rpm ω0 as a reference value, thereby to control the amplitude value of the output voltage of the cycloconverter circuit 50 on the basis of the converted command rpm ω2 and the estimated rotor phase θ so that a difference between the converted command rpm ω2 and the actual rpm ω is minimized, as described for the third embodiment.

In this case, it is possible to disperse the frequency spectrum of the current that is obtained by superposing the n-th order harmonic component of the variable frequency of the power supply output voltage on the driving current of the brushless motor, thereby preventing a harmonic current exceeding the IEC standard value from occurring.

Embodiment 5

Figure 6:
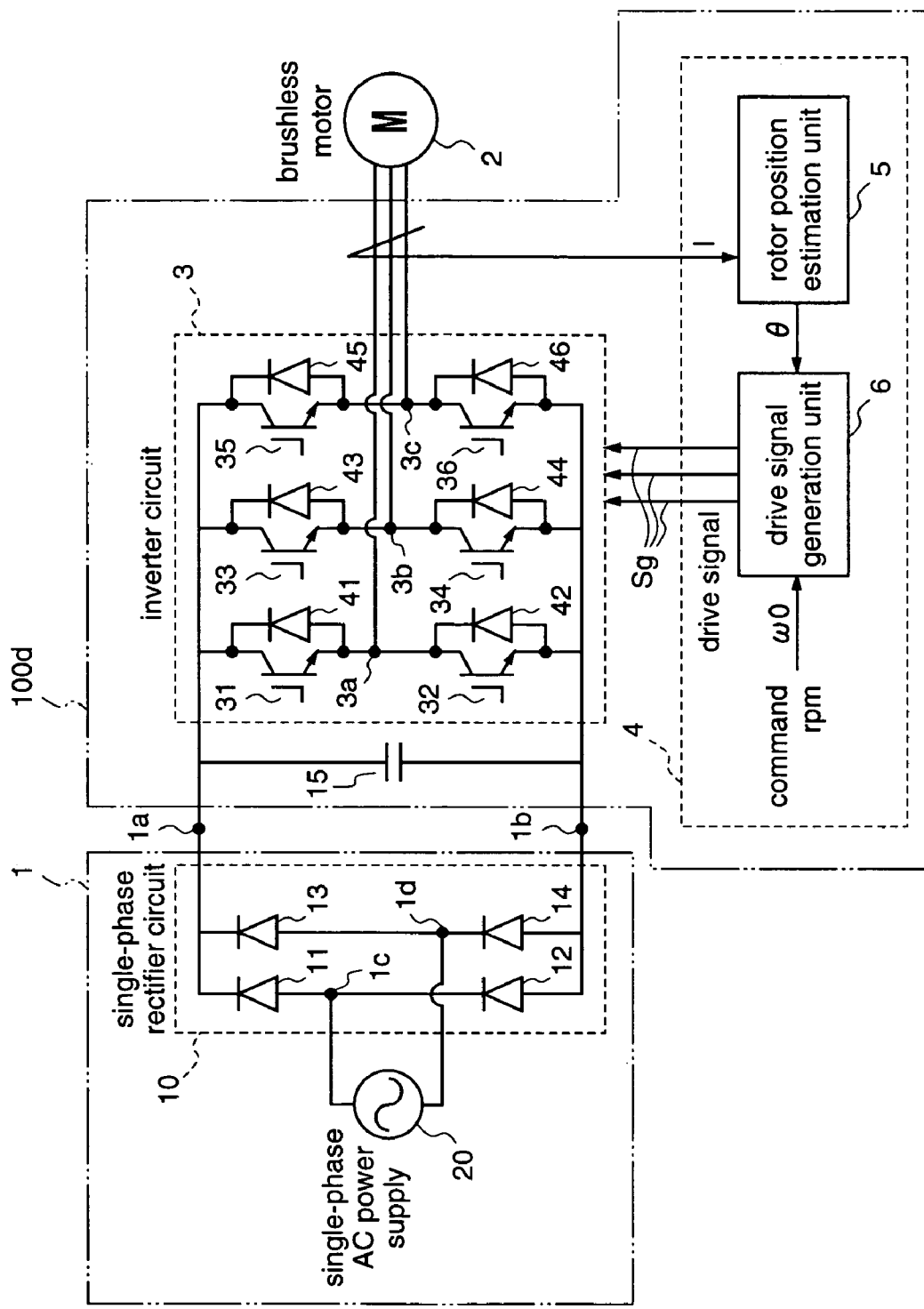
FIG. 6 is a block diagram for explaining a motor driving apparatus according to a fifth embodiment of the present invention.

FIG. 6 is a block diagram for explaining a motor driving apparatus 100d according to a fifth embodiment of the present invention.

The motor driving apparatus 100d according to the fifth embodiment is obtained by adding a small-capacitance capacitor 15 for charging a regenerative current from the brushless motor 2 at the input end of the inverter circuit 3 of the motor driving apparatus 100 according to the first embodiment. The capacitor 15 is connected between an output terminal 1a and the other output terminal 1b of the power supply 1.

The other components of the motor driving apparatus 100d according to the fifth embodiment are identical to those of the motor driving apparatus 100 according to the first embodiment.

The capacitance of the capacitor 15 may be set to such extent that prevents damages on the apparatus due to the motor regenerative current. For example, when the motor driving apparatus controls a motor of a compressor used for a home-use air conditioner, the capacitance of the capacitor 15 is about 1 μF~50 μF. This value is the minimum threshold value that is obtained from the capacitance of the inductance of the motor, the maximum amount of variation that is allowed in the input voltage of the inverter circuit, and the maximum value of the current that flows into the brushless motor 2.

To be specific, the energy that is held by the brushless motor when the maximum current flows in the motor is obtained from the capacitance of the inductance. The capacitance of the capacitor is determined on the basis of the extent to which an increase in the terminal voltage of the capacitor is allowed, which occurs when the energy is given to the capacitor as a motor regenerative current.

Next, the operation will be described.

In the motor driving apparatus 100d according to the fifth embodiment, the inverter circuit 3 and the inverter control unit 4a are operated in like manners as those described for the first embodiment, and therefore, repeated description is not necessary.

When the brushless motor 2 is stopped or the switching operation of the inverter circuit 3 is stopped, the current that flows in the brushless motor 2 is regenerated at the input end of the inverter circuit 3. When the regenerative current is large, the voltage at the input end of the inverter circuit 3 becomes excessively large, resulting in damages in the motor driving apparatus.

In the motor driving apparatus 100d according to the fifth embodiment, since the capacitor 15 is connected at the input end of the inverter circuit 3 as shown in FIG. 6, the regenerative current from the motor 2 is charged in the capacitor 15 when the motor 2 is stopped, thereby suppressing an increase in the voltage at the input end of the inverter circuit 3 due to the regenerative current.

Thereby, the motor driving apparatus is prevented from being damaged by the motor regenerative current that occurs when the motor is stopped, resulting in a motor control apparatus with a higher level of safety.

As described above, according to the fifth embodiment, the inverter circuit 3 of the motor driving apparatus 100 according to the first embodiment is provided with the capacitor 15 for charging the regenerative current from the motor. Therefore, stable drive control for the brushless motor 2 can be realized as in the first embodiment and, moreover, it is possible to suppress an increase in the inverter input voltage, which occurs when the brushless motor 2 is stopped or the switching operation of the inverter circuit 3 is stopped, thereby avoiding destruction of the components of the inverter circuit 3.

In this fifth embodiment, the capacitor for charging the regenerative current from the motor is added at the input end of the inverter circuit 3 of the motor driving apparatus 100 according to the first embodiment. However, the motor driving apparatus according to any of the second to fourth embodiments may be provided with such capacitor.

Embodiment 6

Figure 7:
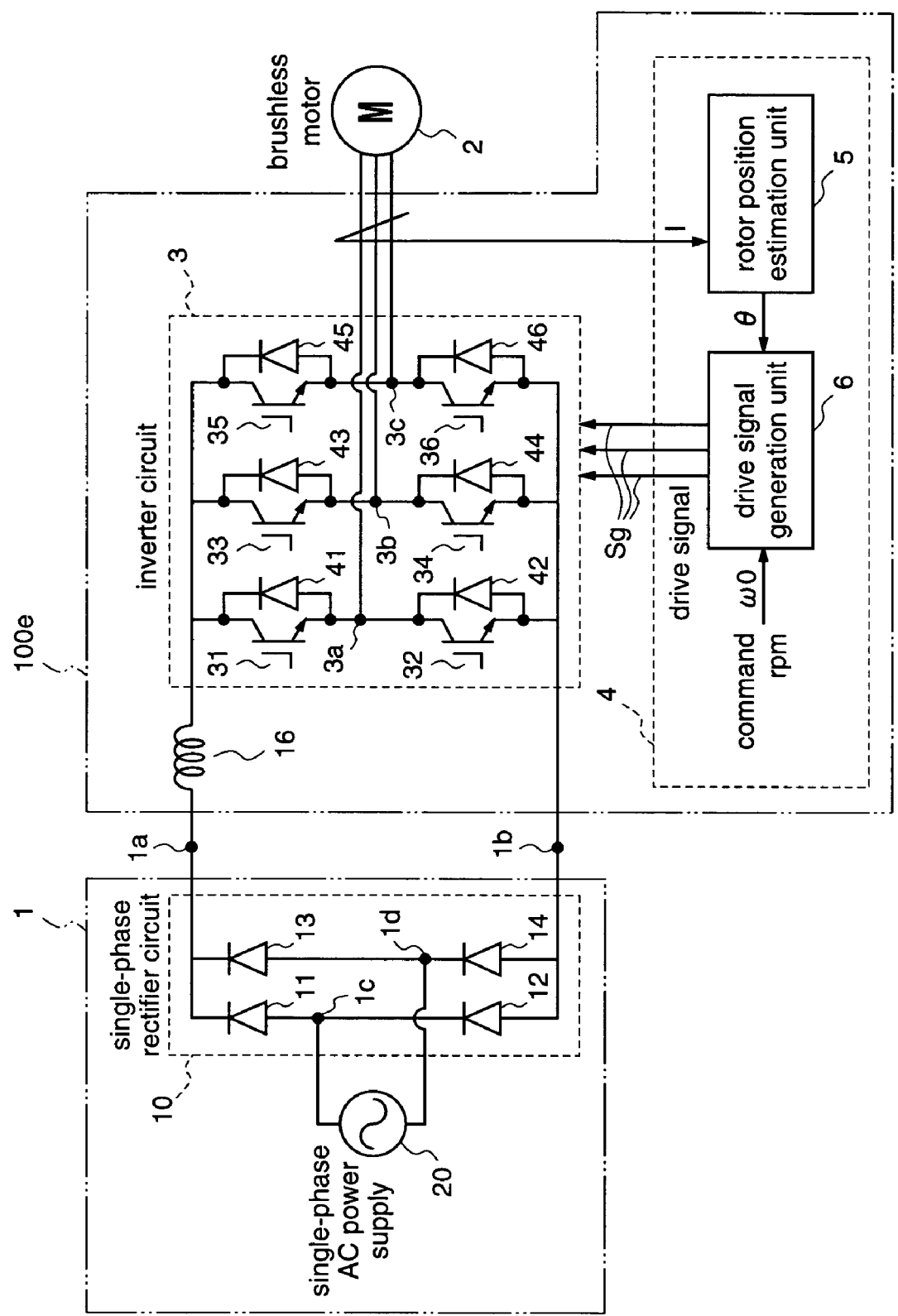
FIG. 7 is a block diagram for explaining a motor driving apparatus according to a sixth embodiment of the present invention.

FIG. 7 is a block diagram for explaining a motor driving apparatus 100e according to a sixth embodiment of the present invention.

The motor driving apparatus 100e according to the sixth embodiment is obtained by inserting an inductor 16 between the inverter circuit 3 and the power supply 1 of the motor driving apparatus 100 according to the first embodiment, and the inductor 16 is connected in series between the power supply 1 and the inverter circuit 3.

The other constituents of the motor driving apparatus 100e are identical to those of the motor driving apparatus 100 according to the first embodiment.

The inductance of the inductor 16 may be set to such extent that eliminates switching current noise caused by switching operation of the inverter circuit 3, and prevents distortion of the waveform of the output current from the power supply 1. For example, when the motor driving apparatus drives a motor of a compressor used in a home-use air conditioner, the inductance of the inductor 16 is about 0.1 mH to 11.0 mH. This value depends on the carrier frequency in the inverter circuit 3, and it is determined so as to suppress the harmonics of the carrier component.

Next, the operation will be described.

In the motor driving apparatus 100e according to the sixth embodiment, the inverter circuit 3 and the inverter control unit 4 operate in like manners as those described for the first embodiment, and therefore, repeated description is not necessary.

The output current of the power supply 1 is affected by the switching operation of the inverter circuit 3, and the switching current is superposed as noise.

In the motor driving apparatus 100e according to the sixth embodiment, as shown in FIG. 7, the noise that occurs in the inverter circuit 3 is cut by the inductor 16 that is inserted between the power supply 1 and the inverter circuit 3, whereby the switching noise superposed on the output current of the power supply 1 is reduced. Thereby, the waveform of the output current of the power supply 1 is prevented from being distorted, resulting in improved power factor of the input current.

As described above, according to the sixth embodiment of the present invention, the inductor 16 for cutting the noise that occurs in the inverter circuit 3 is inserted between the input terminal of the inverter circuit 3 and the power supply 1. Therefore, stable drive control for the brushless motor 2 is realized as in the first embodiment, and moreover, the switching noise superposed on the output of the power supply 1 is reduced, whereby the power factor of the input current is increased, resulting in improved current waveform.

While in this sixth embodiment the inductor 16 for cutting the noise that occurs in the inverter circuit 3 is inserted between the inverter circuit 3 and the power supply 1 of the motor driving apparatus 100 according to the first embodiment, the motor driving apparatus according to any of the second to fourth embodiments may be provided with such inductor.

Further, the motor driving apparatus according to the fifth embodiment is provided with the capacitor 15 at the input end of the inverter circuit 3, and the motor driving apparatus according to the sixth embodiment is provided with the inductor 16 between the inverter circuit 3 and the power supply 1. However, the motor driving apparatus may be provided with both of the capacitor and the inductor.

In this case, since a circuit comprising an inductor and a capacitor connected in series is created, a resonance phenomenon might occur. This resonance frequency is $1/2\pi\sqrt{(LC)}$ as generally known, and it depends on the inductance of the inductor and the capacitance of the capacitor. Accordingly, a motor control apparatus with less noise can be provided by determining the inductance of the inductor and the capacitance of the capacitor so that the resonance frequency becomes higher than the frequency to be a target of harmonic regulation to the power supply.

Embodiment 7

Figure 8:
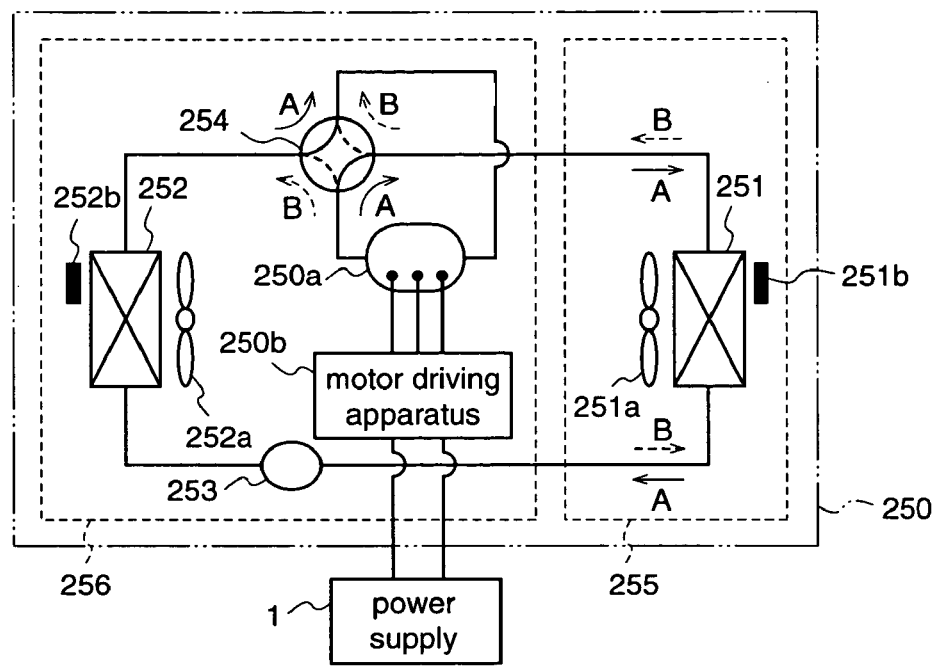
FIG. 8 is a schematic diagram for explaining an air conditioner according to a seventh embodiment of the present invention.

FIG. 8 is a block diagram for explaining an air conditioner according to a seventh embodiment of the present invention.

An air conditioner 250 according to the seventh embodiment has an indoor unit 255 and an outdoor unit 256, and performs cooling and heating.

The air conditioner 250 is provided with a compressor 250a for circulating a refrigerant between the indoor unit 255 and the outdoor unit 256, and a motor driving unit 250b for driving a motor of the compressor 250a with a voltage supplied from a power supply 1. In FIG. 8, the power supply 1, the motor of the compressor 250a, and a motor driving apparatus 250b are identical to the power supply 1, the brushless motor 2, and the motor driving apparatus 100 according to the first embodiment, respectively.

Further, the air conditioner 250 has a four-way valve 254 for forming a refrigerant circulation path, a throttle 253, an indoor heat exchanger 251, and an outdoor heat exchanger 252. The indoor heat exchanger 251 is a component of the indoor unit 255, while the throttle 253, the outdoor heat exchanger 252, the compressor 250a, the four-way valve 254, and the motor driving apparatus 250b are components of the outdoor unit 256.

The indoor heat exchanger 251 has an air blower 251a for increasing the efficiency of heat exchange, and a temperature sensor 251b for measuring the temperature of the heat exchanger 251 or the ambient temperature thereof. The outdoor heat exchanger 252 has an air blower 252a for increasing the efficiency of heat exchange, and a temperature sensor 252b for measuring the temperature of the heat exchanger 252 or the ambient temperature thereof.

In this seventh embodiment, the compressor 250a and the four-way valve 254 are placed in the refrigerant path between the indoor heat exchanger 251 and the outdoor heat exchanger 252. That is, in this air conditioner 250, the four-way valve 254 selects either of two states as follows: the state where the refrigerant flows in the direction of arrow A, the refrigerant that has passed through the outdoor heat exchanger 252 is sucked into the linear compressor 250a, and the refrigerant discharged from the linear compressor 250a is supplied to the indoor heat exchanger 251, and the state where the refrigerant flows in the direction of arrow B, the refrigerant that has passed through the indoor heat exchanger 251 is sucked into the linear compressor 250a, and the refrigerant discharged from the linear compressor 250a is supplied to the outdoor heat exchanger 252.

Further, the throttle 253 has both the function of reducing the flow rate of the circulating refrigerant, and the function as a valve for automatically controlling the flow rate of the refrigerant. That is, under the state where the refrigerant is circulating in the refrigerant circulation path, the throttle 253 reduces the flow rate of the fluid refrigerant outputted from the condenser to the evaporator to expand the fluid refrigerant, and supplies a proper amount of refrigerant that is required for the evaporator.

The indoor heat exchanger 251 operates as the condenser during heating and as the evaporator during cooling. The outdoor heat exchanger 252 operates as the evaporator during heating and as the condenser during cooling. In the condenser, the high-temperature and high-pressure refrigerant gradually liquefies while losing heat to the air that is blown into the condenser, resulting in a high-pressure fluid refrigerant in the vicinity of the outlet of the condenser. This is equivalent to the refrigerant liquefying while radiating heat into the air. Further, the fluid refrigerant whose temperature and pressure are reduced by the throttle 253 flows into the evaporator. When the indoor air is blown into the evaporator under this state, the fluid refrigerant takes a great amount of heat from the air and evaporates, resulting in a low-temperature and low-pressure gas refrigerant. The air which has lost a great amount of heat in the evaporator is discharged as cool air from the blowoff port of the air conditioner.

Then, in the air conditioner 250, a command rpm of the brushless motor is set on the basis of the operation state of the air conditioner, i.e., the target temperature set on the air conditioner and the actual indoor and outdoor temperatures, and the motor driving apparatus 250b controls the rpm of the brushless motor of the compressor 250a on the basis of the set command rpm, as in the first embodiment.

Next, the operation will be described.

When a driving voltage is supplied from the motor driving apparatus 250b to the compressor 250a, the refrigerant circulates in the refrigerant circulation path, and heat exchange is carried out in the heat exchanger 251 of the indoor unit 255 and the heat exchanger 252 of the outdoor unit 256. That is, in the air conditioner 250, a well-known heat pump cycle is formed in the refrigerant circulation path by circulating the refrigerant sealed in the circulation path, using the compressor 250a. Thereby heating or cooling for a room is carried out.

For example, when the air conditioner 250 performs heating, the four-way valve 254 is set by user operation so that the refrigerant flows in the direction of arrow A. In this case, the indoor heat exchanger 251 operates as a condenser, and discharges heat by circulation of the refrigerant in the refrigerant circulation path. Thereby, the room is heated.

Conversely, when the air conditioner 250 performs cooling, the four-way valve 254 is set by user operation so that the refrigerant flows in the direction of arrow B. In this case, the indoor heat exchanger 251 operates as an evaporator, and absorbs heat from the ambient air by circulation of the refrigerant in the refrigerant circulation path. Thereby the room is cooled.

In the air conditioner 250, the command rpm is determined on the basis of the target temperature that is set on the air conditioner, and the actual room temperature and outdoor temperature, and the motor driving apparatus 250b controls the rpm of the brushless motor of the compressor 250a on the basis of the command rpm as in the first embodiment. Thereby, comfortable cooling or heating is carried out by the air conditioner 250.

As described above, in the air conditioner 250 according to the seventh embodiment, the brushless motor is employed as a power source of the compressor 250a, and the amplitude value of the driving voltage applied to the brushless motor is adjusted so that a difference between the command rpm of the brushless motor and the actual rpm thereof is minimized, and the frequency of the driving current applied to the brushless motor does not take a value within a predetermined range, like in the first embodiment. Therefore, the driving frequency of the brushless motor is adjusted with respect to the variable frequency of the input-end AC power supply, thereby preventing the brushless motor from being driven at an rpm that makes the brushless motor unstable, and reducing a harmonic component that appears at the input power supply end due to the driving current of the brushless motor, thereby realizing stable drive of the brushless motor and, furthermore, stable operation of the air conditioner 250 that satisfies the IEC harmonic standards.

Embodiment 8

Figure 9:
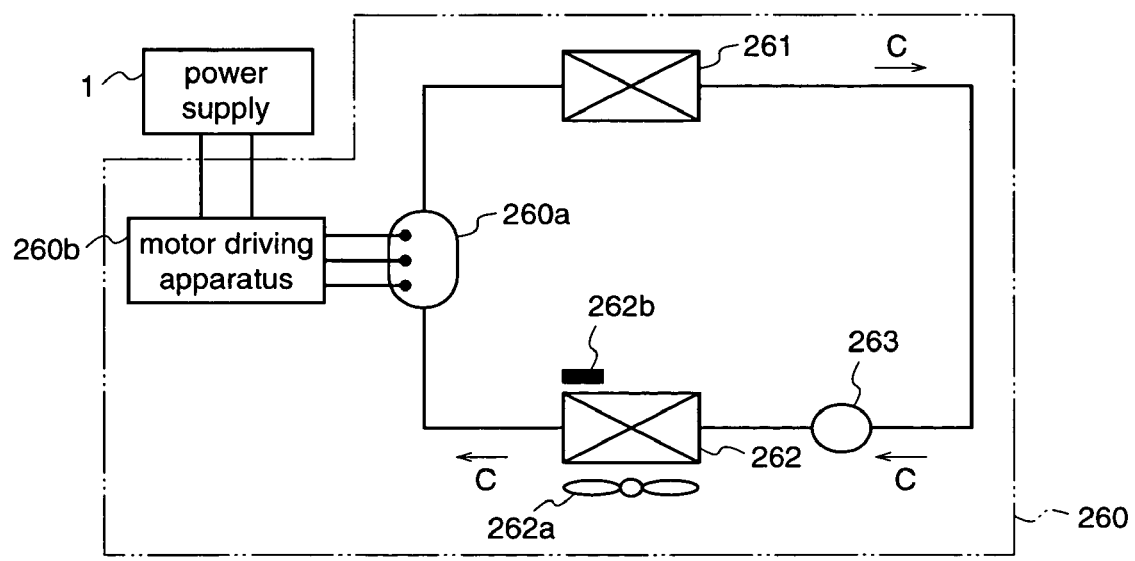
FIG. 9 is a schematic diagram for explaining a refrigerator according to an eighth embodiment of the present invention.

FIG. 9 is a block diagram for explaining a refrigerator according to an eighth embodiment of the present invention.

A refrigerator 260 according to this tenth embodiment comprises a compressor 260a, a motor driving apparatus 260b, a condenser 261, an evaporator 262, and a throttle 263.

The compressor 260a, the condenser 261, the throttle 263, and the evaporator 262 form a refrigerant circulation path, and the motor driving apparatus 260b has an input connected to the power supply 1, and drives a brushless motor that is a drive source of the compressor 260a. The power supply 1, the brushless motor of the compressor 260a, and the motor driving apparatus 260b are identical to the power supply 1, the brushless motor 2, and the motor driving apparatus 100 according to the first embodiment, respectively.

The throttle 263 reduces the flow rate of the fluid refrigerant outputted from the condenser 261 to expand the fluid refrigerant under the state where the refrigerant is circulating in the refrigerant circulation path, and supplies a proper amount of refrigerant that is required for the evaporator 262.

The condenser 261 condenses the high-temperature and high-pressure refrigerant gas that flows in it, and discharges the heat of the refrigerant to the outside air. The refrigerant gas sent into the condenser 261 gradually liquefies while losing heat to the outside air, resulting in a high-pressure fluid refrigerant in the vicinity of the outlet of the condenser.

The evaporator 262 evaporates the low-temperature fluid refrigerant to cool the inside of the refrigerator. The evaporator 262 has an air blower 262a for increasing efficiency of heat exchange, and a temperature sensor 262b for detecting the temperature inside the refrigerator.

In the refrigerator 260, a command rpm is set on the basis of the operation state of the refrigerator, i.e., the target temperature set on the refrigerator and the temperature inside the refrigerator, and the motor driving apparatus 260b controls the rpm of the brushless motor of the compressor 260a on the basis of the set command rpm, as in the first embodiment.

Next, the operation will be described.

In the refrigerator 260 according to the eighth embodiment, when a driving voltage is supplied from the motor driving apparatus 260b to the brushless motor of the compressor 260a, the compressor 260a is driven and the refrigerant circulates in the direction of arrow C in the refrigerant circulation path, whereby heat exchange is carried out between the condenser 261 and the evaporator 262. Thereby, the inside of the refrigerator is cooled.

That is, the flow rate of the refrigerant, which is liquefied in the condenser 261, is reduced by the throttle 263, and thereby the refrigerant expands, resulting in a low-temperature fluid refrigerant. When the low-temperature fluid refrigerant is sent into the evaporator 262, it is evaporated in the evaporator 262, whereby the inside of the refrigerator is cooled. At this time, the air in the refrigerator is compulsory sent into the evaporator 262 by the air blower 262a, and thereby heat exchange is efficiently carried out in the evaporator 262.

Further, in the refrigerator 260, the command rpm is set according to the target temperature that is set on the refrigerator 260, and the temperature in the refrigerator, and the motor driving apparatus 260b controls the rpm of the brushless motor of the compressor 260a on the basis of the set command rpm ω0, as in the first embodiment. Thereby, in the refrigerator 260, the temperature in the refrigerator is maintained at the target temperature.

As described above, in the refrigerator 260 according to the eighth embodiment, the brushless motor is employed as a power source of the compressor 260a, and the amplitude value of the driving voltage supplied to the brushless motor is controlled so that a difference between the command rpm of the brushless motor and the actual rpm thereof is minimized, and the frequency of the driving current applied to the brushless motor does not take a value within a predetermined range, like in the first embodiment. Therefore, the driving frequency of the brushless motor is adjusted with respect to the variable frequency of the input-end AC power supply, thereby preventing the brushless motor from being driven at an rpm that makes the brushless motor unstable, and reducing a harmonic component that appears at the input power supply end due to the driving current of the brushless motor, resulting in stable drive of the brushless motor and, furthermore, stable operation of the refrigerator 260 that satisfies the IEC harmonic standards.

Embodiment 9

Figure 10:
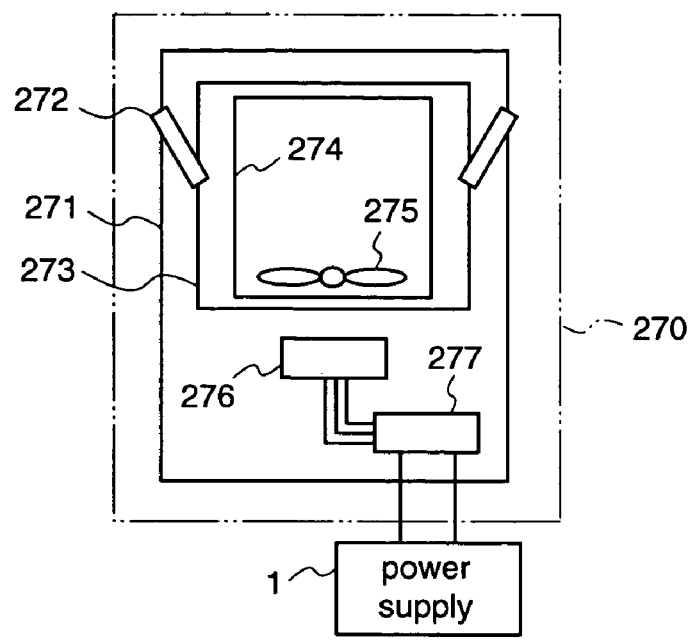
FIG. 10 is a schematic diagram for explaining a washing machine according to a ninth embodiment of the present invention.

FIG. 10 is a block diagram for explaining an electric washing machine according to a ninth embodiment of the present invention.

A washing machine 270 according to the ninth embodiment has a washing machine outer frame 271, and an outer bath 273 is hung by a bar 272 in the outer frame 271. A washing/dewatering bath 274 is rotatably placed in the outer frame 273, and an agitation blade 275 is rotatably attached to the bottom of the washing/dewatering bath 274.

A brushless motor 276 for rotating the washing/dewatering bath 274 and the agitation blade 275 are placed in a space beneath the outer bath 273 in the outer frame 271, and a motor driving apparatus 277 that is connected to an external power supply 1 and drives the brushless motor 276 is attached to the outer frame 271.

The power supply 1, the brushless motor 276, and the motor driving apparatus 277 are identical to the power supply 1, the brushless motor 2, and the motor driving apparatus 100 according to the first embodiment, respectively. A command signal indicating a command rpm according to user operation is input to the motor driving apparatus 277 from a microcomputer (not shown) that controls the operation of the washing machine 270.

Next, the operation will be described.

In the washing machine 270, when the user performs a predetermined operation, a command signal is output from the microcomputer to the motor driving apparatus 277, and a driving voltage is supplied from the motor driving apparatus 277 to the brushless motor 276. Then, the agitation blade 275 or the washing/dewatering bath 274 is rotated by the brushless motor 276, and washing or dewatering of laundry, such as clothes, in the bath 274 is carried out.

At this time, the rpm of the brushless motor 276 is controlled by the motor driving apparatus 277 on the basis of the command rpm indicated by the command signal from the microcomputer, as in the first embodiment. Thereby, the washing machine 270 is operated according to the amount or stains of laundry.

As described above, in the washing machine 270 according to the ninth embodiment, the brushless motor 276 is employed as a power source, and the amplitude value of the driving voltage applied to the brushless motor is adjusted so that a difference between the command rpm of the brushless motor and the actual rpm thereof is minimized, and the frequency of the driving current applied to the brushless motor does not take a value within a predetermined range, as in the first embodiment. Therefore, the driving frequency of the brushless motor is adjusted with respect to the variable frequency of the input-end AC power supply, thereby preventing the brushless motor from being driven at an rpm that makes the brushless motor unstable, and reducing a harmonic component that appears at the input power supply end due to the driving current of the brushless motor, resulting in stable drive of the brushless motor and, furthermore, stable operation of the washing machine 270 that satisfies the IEC harmonic standards.

Embodiment 10

Figure 11:
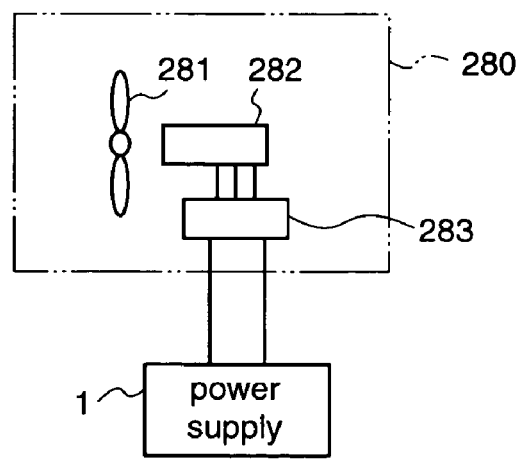
FIG. 11 is a schematic diagram for explaining an air blower according to a tenth embodiment of the present invention.

FIG. 11 is a block diagram for explaining an air blower according to a tenth embodiment of the present invention.

An air blower 280 according to the tenth embodiment is provided with a fan 281, a brushless motor 282 for rotating the fan 281, and a motor driving apparatus 283 that is connected to a power supply 1 and drives the brushless motor 282.

The power supply 1, the brushless motor 282, and the motor driving apparatus 283 are identical to the power supply 1, the brushless motor 2, and the motor driving apparatus 100 according to the first embodiment, respectively, and a command signal indicating a command rpm according to user operation is input to the motor driving apparatus 283 from a microcomputer that controls the operation of the air blower 280.

Next, the operation will be described.

In the air blower 280, when the user performs a predetermined operation, a command signal is output from the microcomputer to the motor driving apparatus 283, and a driving voltage is supplied from the motor driving apparatus 283 to the motor 282. Then, the fan 281 is rotated by the brushless motor 282, and air blowing is carried out.

At this time, in the air blower 280, the output of the brushless motor 282 is controlled by the motor driving apparatus 283 on the basis of the command signal from the microcomputer, as in the first embodiment. Thereby, the amount or strength of wind is controlled.

As described above, in the air blower 280 according to the tenth embodiment, the brushless motor 282 is employed as a power source, and the amplitude value of the driving voltage supplied to the brushless motor 282 is adjusted so that a difference between the command rpm of the brushless motor and the actual rpm thereof is minimized, and the frequency of the driving current applied to the brushless motor does not take a value within a predetermined range, as in the first embodiment. Therefore, the driving frequency of the brushless motor is adjusted with respect to the variable frequency of the input-end AC power supply, thereby preventing the brushless motor from being driven at an rpm that makes the brushless motor unstable, and reducing a harmonic component that appears at the input power supply end due to the driving current of the brushless motor, resulting in stable drive of the brushless motor and, furthermore, stable operation of the air blower 280 that satisfies the IEC harmonic standards.

Embodiment 11

Figure 12:
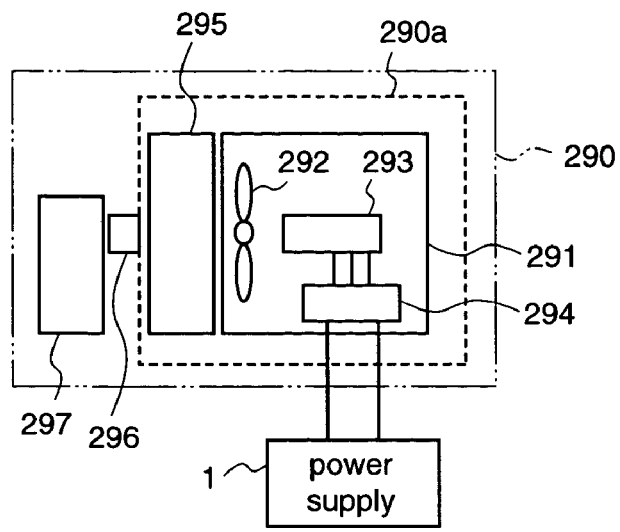
FIG. 12 is a schematic diagram for explaining a vacuum cleaner according to an eleventh embodiment of the present invention.

FIG. 12 is a block diagram for explaining an electric vacuum cleaner according to an eleventh embodiment of the present invention.

A vacuum cleaner 290 according to the eleventh embodiment is provided with a floor suction head 297 having an inlet at its bottom, a vacuum cleaner body 290a for sucking air, and a dust suction hose having an end connected to the floor suction head 297 and the other end connected to the cleaner body 290a.

The cleaner body 290a comprises a dust collection chamber 295 having a front surface at which the other end of the dust suction hose 296 is opened, and an electric air blower 291 placed at the rear surface of the dust collecting chamber 295.

The electric air blower 291 comprises a fan 292 placed opposite to the rear surface of the dust collection chamber 295, a brushless motor 293 for rotating the fan, and a motor driving apparatus 294 that is connected to a power supply 1 and drives the brushless motor 293. The air blower 291 performs air blowing so that suction of air is carried out by rotation of the fan 292.

The power supply 1, the brushless motor 293, and the motor driving apparatus 294 are identical to the power supply 1, the brushless motor 2, and the motor driving apparatus 100 according to the first embodiment, respectively, and a command signal indicating a command rpm according to user operation is input to the motor driving apparatus 294 from a microcomputer that controls the operation of the air blower 290.

Next, the operation will be described.

In the vacuum cleaner 290, when the user performs a predetermined operation, a command signal is output from the microcomputer to the motor driving apparatus 294, and a driving voltage is supplied from the motor driving apparatus 294 to the brushless motor 293. Then, the fan 292 is rotated by the brushless motor 293, and a suction force is generated in the cleaner body 290a. The suction force generated in the cleaner body 290a acts on the inlet (not shown) at the bottom of the floor suction head 297 through the hose 296, and dust on the floor is sucked from the inlet of the floor suction head 297 to be collected into the dust collection chamber of the cleaner body 290a.

At this time, in the vacuum cleaner 290, the rpm of the brushless motor 293 is controlled by the motor driving apparatus 294 on the basis of the command signal from the microcomputer, as in the first embodiment. Thereby, the strength of the suction force is controlled.

As described above, in the vacuum cleaner 290 according to the eleventh embodiment, the brushless motor 293 is employed as a power source, and the amplitude value of the driving voltage supplied to the brushless motor 293 is adjusted so that a difference between the command rpm of the brushless motor and the actual rpm thereof is minimized, and the frequency of the driving current applied to the brushless motor does not take a value within a predetermined range, as in the first embodiment. Therefore, the driving frequency of the brushless motor is adjusted with respect to the variable frequency of the input-end AC power supply, thereby preventing the brushless motor from being driven at an rpm that makes the brushless motor unstable, and reducing a harmonic component that appears at the input power supply end due to the driving current of the brushless motor, resulting in stable drive of the brushless motor and, furthermore, stable operation of the vacuum cleaner 290 that satisfies the IEC harmonic standards.

Embodiment 12

Figure 13:
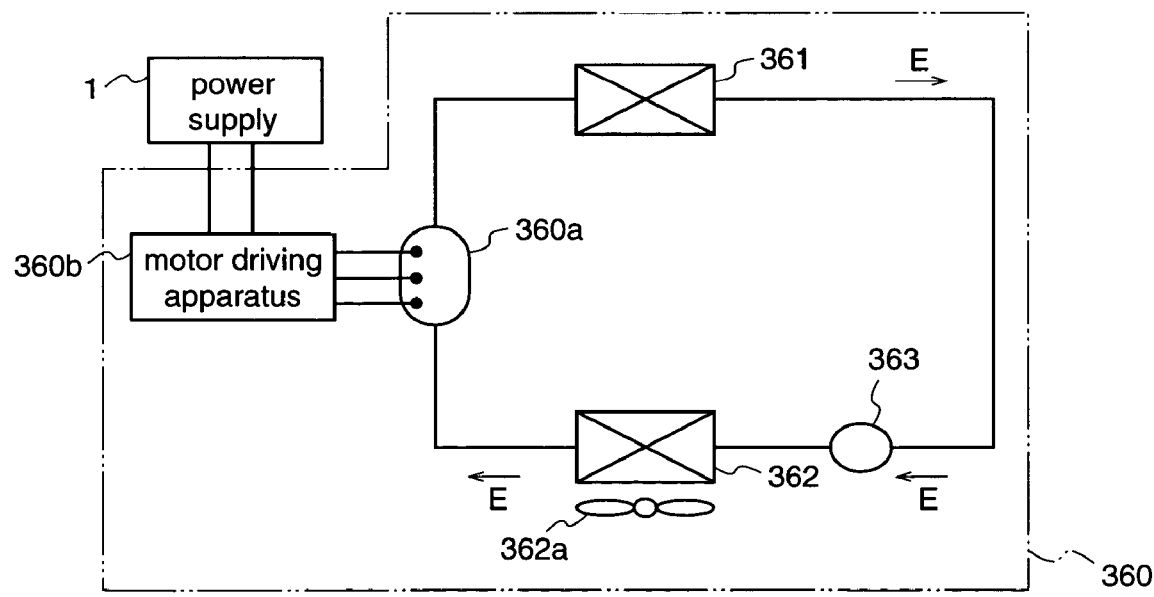
FIG. 13 is a schematic diagram for explaining a dryer according to a twelfth embodiment of the present invention.

FIG. 13 is a block diagram for explaining an electric dryer according to a twelfth embodiment of the present invention.

An electric dryer 360 according to the twelfth embodiment comprises a compressor 360a, a motor driving apparatus 360b, a condenser 361, an evaporator 362, and a throttle 363.

The compressor 360a, the condenser 361, the throttle 363, and the evaporator 362 form a refrigerant circulation path. The motor driving apparatus 360b has an input connected to a power supply 1, and drives a brushless motor as a driving source for the compressor 360a. The power supply 1, the brushless motor of the compressor 360a, and the motor driving apparatus 360b are identical to the power supply 1, the brushless motor 2, and the motor driving apparatus 100 according to the first embodiment, respectively.

The throttle 363 reduces the flow rate of the fluid refrigerant outputted from the condenser 361 to expand the fluid refrigerant under the state where the refrigerant is circulating in the refrigerant circulation path, and supplies a proper amount of refrigerant that is required for the evaporator 362.

The condenser 361 condenses the high-temperature and high-pressure refrigerant gas that flows therein, and discharges the heat of the refrigerant to the outside air. The refrigerant gas sent into the condenser 361 gradually liquefies while losing heat to the outside air, resulting in a high-pressure fluid refrigerant in the vicinity of the outlet of the condenser.

The evaporator 362 evaporates the low-temperature fluid refrigerant to dehumidify the inside of the dryer. The evaporator 362 has an air blower 362a for increasing efficiency of dehumidification, and a temperature sensor 362b for detecting the temperature in the dryer.

In the dryer 360, a command rpm is set on the basis of the operating state of the dryer, i.e., the degree of dehumidification set on the dryer, and the humidity in the dryer, and the motor driving apparatus 360b controls the rpm of the brushless motor of the compressor 360a on the basis of the set command rpm, as in the first embodiment.

Next, the operation will be described.

In the electric dryer 360 according to the twelfth embodiment, when a driving voltage is applied to the brushless motor of the compressor 360a from the motor driving apparatus 360b, the compressor 360a is driven and the refrigerant is circulated in the direction of arrow E in the refrigerant circulation path, whereby heat exchange is carried out in the condenser 361 and in the evaporator 362. Thereby, dehumidification is carried out in the dryer.

That is, the flow rate of the refrigerant, which is liquefied in the condenser 361, is reduced by the throttle 363, and thereby the refrigerant expands, resulting in a low-temperature fluid refrigerant. When the low-temperature fluid refrigerant is sent into the evaporator 362, it is evaporated in the evaporator 362, whereby the inside of the dryer is dehumidified. To be specific, the moist air in the dryer is cooled down to its dew-point humidity or lower, and the air from which moisture is removed as condensed water is heated again. At this time, the air in the dryer is compulsory sent into the evaporator by the air blower, and thereby heat exchange is efficiently carried out in the evaporator.

Further, in the electric dryer 360 according to the twelfth embodiment, a command rpm is set on the basis of the degree of dehumidification set on the dryer and the humidity in the dryer, and the motor driving apparatus 360b controls the rpm of the brushless motor of the compressor 360a on the basis of the set command rpm ω0, as in the first embodiment. Thereby, the humidity in the dryer 360 is maintained at the target humidity.

As described above, in the electric dryer 360 according to the twelfth embodiment, the brushless motor is employed as a power source of the compressor 360a, and the amplitude value of the driving voltage supplied to the brushless motor is controlled so that a difference between the command rpm of the brushless motor and the actual rpm thereof is minimized, and the frequency of the driving current applied to the brushless motor does not take a value within a predetermined range, as in the first embodiment. Therefore, the driving frequency of the brushless motor is adjusted with respect to the variable frequency of the input-end AC power supply, thereby preventing the brushless motor from being driven at an rpm that makes the brushless motor unstable, and reducing a harmonic component that appears at the input power supply end due to the driving current of the brushless motor, resulting in stable drive of the brushless motor and, furthermore, stable operation of the dryer 360 that satisfies the IEC harmonic standards.

Embodiment 13

Figure 14:
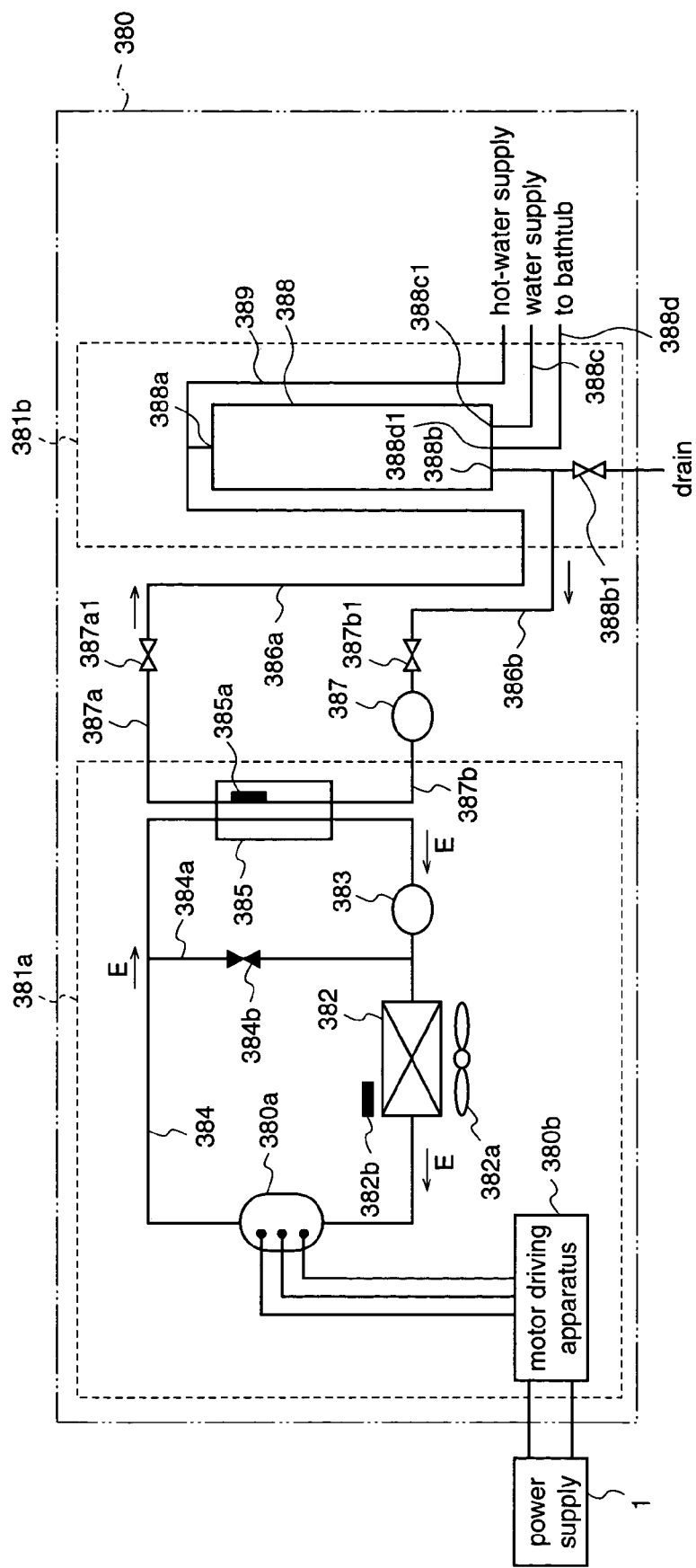
FIG. 14 is a schematic diagram for explaining a heat pump type hot-water supply unit according to a thirteenth embodiment of the present invention.

FIG. 14 is a block diagram for explaining a heat pump type hot-water supply unit according to a thirteenth embodiment of the present invention.

A heat pump type hot-water supply unit 380 according to the thirteenth embodiment includes a refrigeration cycle unit 381a for heating supplied water to discharge hot water, a hot-water storage 381b in which the hot water discharged from the refrigeration cycle unit 381a is stored, and pipes 386a, 386b, 387a, and 387b connecting the refrigeration cycle unit 381a and the hot-water storage 381b.

The refrigeration cycle unit 381a includes a compressor 380a, an air-refrigerant heat exchanger 382, a throttle 383, and a water-refrigerant heat exchanger 385, which constitute a refrigerant circulation path, and a motor driving apparatus 380b that has an input connected to a power supply 1 and drives the motor of the compressor 380a.

The power supply 1, the brushless motor of the compressor 380a, and the motor driving apparatus 380b are identical to the power supply 1, the brushless motor 2, and the motor driving apparatus 100 according to the first embodiment, respectively.

The throttle 383 reduces the flow rate of the fluid refrigerant that is sent from the water-refrigerant heat exchanger 385 to the air-refrigerant heat exchanger 382 to expand the fluid refrigerant, like the throttle 253 of the air conditioner 250 of the ninth embodiment.

The water-refrigerant heat exchanger 385 is a condenser that heats up the water supplied to the refrigeration cycle unit 381a, and has a temperature sensor 385a for detecting the temperature of the heated water. The air-refrigerant heat exchanger 382 is an evaporator that absorbs heat from the ambient atmosphere, and has an air blower 382a for increasing the efficiency of heat exchange, and a temperature sensor 382b for detecting the ambient temperature.

In FIG. 14, reference numeral 384 denotes a refrigerant pipe for circulating the refrigerant along the refrigerant circulation path that is formed by the compressor 380a, the water-refrigerant heat exchanger 385, the throttle 383, and the air-refrigerant heat exchanger 382. The refrigerant pipe 284 is connected to a defrost bypass pipe 384a for supplying the refrigerant discharged from the linear compressor 380a to the air-refrigerant heat exchanger 382, bypassing the water-refrigerant heat exchanger 385 and the throttle 383, and a defrost bypass valve 384b is provided in a portion of the bypass pipe 384a.

The hot-water storage 381b has a hot-water storage tank 388 for keeping water or hot water. A water supply pipe 388c for supplying water from the outside to the storage tank 388 is connected to a water intake port 388c1 of the storage tank 388, and a hot-water supply pipe 388d for supplying hot-water from the storage tank 388 to a bathtub is connected to a hot-water discharge port 388d1 of the storage tank 388. Further, a hot-water supply pipe 389 for supplying the hot water stored in the storage tank 388 to the outside is connected to a water intake/discharge port 388a of the storage tank 388.

The storage tank 388 and the water-refrigerant heat exchanger 385 of the refrigeration cycle 381a unit are connected to each other through water supply pipes 386a, 386b, 387a, and 387b, and a water circulation path is formed between the storage tank 388 and the water-refrigerant heat exchanger 385.

The water supply pipe 386b is a pipe for supplying water from the storage tank 388 to the water-refrigerant heat exchanger 385, and an end of this pipe is connected to a water discharge port 388b of the storage tank 388 while the other end is connected to a water intake side pipe 387b of the water-refrigerant heat exchanger 385 through a joint 387b1. Further, a discharge valve 388b1 for discharging the water or hot water stored in the storage tank 388 is fixed to an end of the water supply pipe 386b. The water supply pipe 386a is a pipe for returning the water from the water-refrigerant heat exchanger 385 to the storage tank 388, and an end of this pipe is connected to the water intake/discharge port 388a of the storage tank 388 while the other end is connected to a discharge side pipe 387a of the water-refrigerant heat exchanger 385 through a joint 387a1.

A pump 387 for circulating the water in the water circulation path is provided in a portion of the water intake side pipe 387b of the water-refrigerant heat exchanger 385.

Further, in the hot-water supply unit 380, a command rpm of the brushless motor is determined on the basis of the operating state of the hot-water supply unit, that is, the target temperature of hot water which is set on the supply unit, the temperature of the water that is supplied from the hot-water storage 381b to the water-refrigerant heat exchanger 385a of refrigeration cycle unit 381a, and the outdoor temperature. The motor driving apparatus 380b determines a motor output required for the brushless motor of the compressor 380a on the basis of the command rpm.

Next, the operation will be described.

When a driving voltage is supplied from the motor drive control unit 380b to the brushless motor of the compressor 380 to drive the compressor 380a, the high-temperature refrigerant compressed by the compressor 380a circulates in the direction of arrow E, that is, the refrigerant passes through the refrigerant pipe 384 and supplied to the water-refrigerant heat exchanger 385. Further, when the pump 387 in the water circulation path is driven, water is supplied from the storage tank 388 to the water-refrigerant heat exchanger 385.

In the water-refrigerant heat exchanger 385, heat exchange is carried out between the refrigerant and the water that is supplied from the storage tank 388, whereby heat moves from the refrigerant to the water. That is, the supplied water is heated, and the heated water (hot water) is supplied to the storage tank 388. At this time, the temperature of the heated water is observed by the condensation temperature sensor 385*a*.

Further, in the water-refrigerant heat exchanger 385, the refrigerant is condensed by the above-mentioned heat exchange, and the flow rate of the condensed fluid refrigerant is reduced by the throttle 383 to expand the refrigerant, and the refrigerant is sent to the air-refrigerant heat exchanger 382. In the hot-water supply unit 380, the air-refrigerant heat exchanger 382 serves as an evaporator. That is, the air-refrigerant heat exchanger 382 absorbs heat from the outside air that is sent by the air blower 382*b* to evaporate the low-temperature fluid refrigerant. At this time, the temperature of the ambient atmosphere of the air-refrigerant heat exchanger 382 is observed by the temperature sensor 382*b*.

Further, in the refrigeration cycle unit 381*a*, when the air-refrigerant heat exchanger 382 is frosted, the defrost bypass valve 384*b* is opened, and the high-temperature refrigerant is supplied to the air-refrigerant heat exchanger 382 through the defrost bypass line 384*a*. Thereby, the air-refrigerant heat exchanger 382 is defrosted.

On the other hand, the hot water is supplied from the water-refrigerant heat exchanger 385 of the refrigeration cycle unit 381*a* to the hot-water storage 81*b* through the pipes 87*a* and 86*a*, and the supplied hot water is stored in the storage tank 388. The hot water in the storage tank 388 is supplied to the outside through the hot-water supply pipe 389 as required. Especially when the hot water is supplied to a bathtub, the hot water in the storage tank 388 is supplied to the bathtub through a hot-water supply pipe 388*d* for the bathtub.

Further, when the amount of water or hot water stored in the storage tank 388 becomes lower than a predetermined amount, water is supplied from the outside through the water supply pipe 388*c*.

In the hot-water supply unit 380 according to the thirteenth embodiment, the motor driving apparatus 380*b* determines a command rpm of the brushless motor, on the basis of the target temperature of the hot water, which is set on the hot-water supply unit 380, the temperature of the water supplied to the water-refrigerant heat exchanger 385*a*, and the outside temperature, and the motor driving apparatus 380*b* controls the rpm of the brushless motor of the compressor 380*a* on the basis of the command rpm. Thereby, hot water of the target temperature is supplied by the hot-water supply unit 380.

As described above, in the heat pump type hot-water supply unit 380 according to the thirteenth embodiment, the brushless motor is employed as a power source of the compressor 380*a*, and the amplitude value of the driving voltage supplied to the brushless motor is controlled so that a difference between the command rpm of the brushless motor and the actual rpm thereof is minimized, and the frequency of the driving current applied to the brushless motor does not take a value within a predetermined range, as in the first embodiment. Therefore, the driving frequency of the brushless motor is adjusted with respect to the variable frequency of the input-end AC power supply, thereby preventing the brushless motor from being driven at an rpm that makes the brushless motor unstable, and reducing a harmonic component that appears at the input power supply end due to the driving current of the brushless motor, resulting in stable drive of the brushless motor and, furthermore, stable operation of the hot-water supply unit 380 that satisfies the IEC harmonic standards.

In the seventh to thirteenth embodiments, the motor driving apparatus for driving the brushless motor as a power source is identical to the motor driving apparatus according to the first embodiment. However, the motor driving apparatus according to the seventh to thirteenth embodiments may be identical to any of the motor driving apparatus according to the second to sixth embodiments.

Further, in the seventh to thirteenth embodiments, an air conditioner, a refrigerator, an electric washing machine, an air blower, a vacuum cleaner, an electric dryer, and a heat pump type hot-water supply unit are described as electric equipment employing the motor driving apparatus of the present invention, respectively. However, the motor driving apparatus of the present invention may be applied to any electric equipment that has a brushless motor as a power source and is subjected to the IEC restrictions.

The motor driving apparatus according to the present invention controls is of great value as a controller for controlling a power conversion circuit to which a power supply voltage is input so that the frequency of a driving current supplied from the power conversion circuit to a brushless motor is not fixed to a specific value, whereby the brushless motor is prevented from being driven at an rpm that makes the operating state of the brushless motor unstable.

What is claimed is:

1. A motor driving apparatus for driving a brushless motor on a basis of a command revolution speed of the brushless motor, said motor driving apparatus comprising:
    an inverter circuit operable to convert an output voltage of a DC power supply into a driving voltage, and to output the driving voltage to the brushless motor; and
    a control unit operable to control said inverter circuit so that an actual revolution speed of the brushless motor reaches the command revolution speed,
    wherein said control unit controls said inverter circuit so as to vary the actual revolution speed of the brushless motor immediately when the actual revolution speed reaches the command revolution speed, in a state where the command revolution speed of the brushless motor is equal to a specific revolution speed that is determined according to a variable frequency of a voltage output from the DC power supply.

2. A motor driving apparatus as defined in claim 1,
    wherein the specific frequency includes a frequency that is an integral multiple of the variable frequency of the voltage output from the DC power supply and its vicinity.

3. A motor driving apparatus as defined in claim 1,
    wherein the brushless motor is a three-phase brushless motor; and
    wherein the specific frequency is an integral multiple of a frequency that is obtained by multiplying the variable frequency of the voltage output from the DC power supply by ⅙.

4. A motor driving apparatus for driving a brushless motor on a basis of a first command revolution speed of the brushless motor, said motor driving apparatus comprising:
    an inverter circuit operable to convert an output voltage of a DC power supply into a driving voltage, and to output the driving voltage to the brushless motor;
    a command revolution speed conversion unit operable to convert the first command revolution speed into a second command revolution speed that continuously varies with the first command revolution speed as its center; and a control unit operable to vary a duty ratio of a control signal which is input to said inverter circuit so that an actual revolution speed of the brushless motor reaches the second command revolution speed.

5. A motor driving apparatus as defined in claim 4, wherein the frequency of the output current of said inverter circuit varies at random.

6. A motor driving apparatus as defined in claim 1,
wherein said DC power supply comprises a single-phase AC power supply and a rectifier circuit having an input connected to the single-phase AC power supply; and
wherein a capacitor for charging a regenerative current from the brushless motor is connected to an upstream side of said inverter circuit.

7. A motor driving apparatus as defined in claim 1,
wherein said DC power supply comprises a single-phase AC power supply and a rectifier circuit having an input connected to the single-phase AC power supply; and
wherein an inductor for cutting noise that occurs in said inverter circuit is connected between said inverter circuit and the DC power supply.

8. A motor driving apparatus as defined in claim 1,
wherein said DC power supply comprises a three-phase AC power supply and a three-phase rectifier circuit having an input connected to the three-phase AC power supply; and
wherein said inverter circuit converts an output voltage of the three-phase rectifier circuit into a driving voltage, and outputs the driving voltage to the brushless motor.

9. A motor driving apparatus for driving a brushless motor on a basis of a command revolution speed of the brushless motor, said motor driving apparatus comprising:
a cycloconverter circuit operable to convert an output voltage of a single-phase AC power supply into a driving voltage, and to output the driving voltage to the brushless motor; and
a control unit operable to control said cycloconverter circuit so that an actual revolution speed of the brushless motor reaches the command revolution speed,
wherein said control unit controls said cycloconverter circuit so as to vary the actual revolution speed of the brushless motor immediately when the actual revolution speed reaches the command revolution speed, in a state where the command revolution speed of the brushless motor is equal to a specific revolution speed that is determined according to a frequency of a voltage output from the single-phase AC power supply.

10. A compressor having a brushless motor, and a motor driving apparatus for driving the brushless motor,
said motor driving apparatus being a motor driving apparatus as defined in claim 1.

11. An air conditioner having a compressor including a brushless motor, and a motor driving apparatus for driving the brushless motor,
said motor driving apparatus being a motor driving apparatus as defined in claim 1.

12. A refrigerator having a compressor including a brushless motor, and a motor driving apparatus for driving the brushless motor,
said motor driving apparatus being a motor driving apparatus as defined in claim 1.

13. An electric washing machine having a brushless motor, and a motor driving apparatus for driving the brushless motor,
said motor driving apparatus being a motor driving apparatus as defined in claim 1.

14. An air blower having a brushless motor, and a motor driving apparatus for driving the brushless motor,
said motor driving apparatus being a motor driving apparatus as defined in claim 1.

15. An electric vacuum cleaner having a brushless motor, and a motor driving apparatus for driving the brushless motor,
said motor driving apparatus being a motor driving apparatus as defined in claim 1.

16. An electric dryer having a compressor including a brushless motor, and a motor driving apparatus for driving the brushless motor,
said motor driving apparatus being a motor driving apparatus as defined in claim 1.

17. A heat pump type hot-water supply unit having a compressor including a brushless motor, and a motor driving apparatus for driving the brushless motor,
said motor driving apparatus being a motor driving apparatus as defined in claim 1.

18. A motor driving apparatus as defined in claim 4,
wherein said DC power supply comprises a single-phase AC power supply and a rectifier circuit having an input connected to the single-phase AC power supply; and
wherein a capacitor for charging a regenerative current from the brushless motor is connected to an upstream side of said inverter circuit.

19. A motor driving apparatus as defined in claim 4,
wherein said DC power supply comprises a single-phase AC power supply and a rectifier circuit having an input connected to the single-phase AC power supply; and
wherein an inductor for cutting noise that occurs in said inverter circuit is connected between said inverter circuit and the DC power supply.

20. A motor driving apparatus as defined in claim 4,
wherein the DC power supply comprises a three-phase AC power supply and a three-phase rectifier circuit having an input connected to the three-phase AC power supply; and
wherein said inverter circuit converts an output voltage of the three-phase rectifier circuit into a driving voltage, and outputs the driving voltage to the brushless motor.

21. A motor driving apparatus for driving a brushless motor on a basis of a first command revolution speed of the brushless motor, said motor driving apparatus comprising:
a cycloconverter circuit operable to convert an output voltage of a single-phase AC power supply into a driving voltage, and to output the driving voltage to the brushless motor;
a command revolution speed conversion unit operable to convert the first command revolution speed into a second command revolution speed that continuously varies with the first command revolution speed as its center; and
a control unit operable to vary a duty ratio of a control signal which is input to said cycloconverter circuit so that an actual revolution speed of the brushless motor reaches the second command revolution speed.

22. A compressor having a brushless motor, and a motor driving apparatus for driving the brushless motor,
said motor driving apparatus being a motor driving apparatus as defined in claim 4.

23. An air conditioner having a compressor including a brushless motor, and a motor driving apparatus for driving the brushless motor,
said motor driving apparatus being a motor driving apparatus as defined in claim 4.

24. A refrigerator having a compressor including a brushless motor, and a motor driving apparatus for driving the brushless motor, said motor driving apparatus being a motor driving apparatus as defined in claim 4.

25. An electric washing machine having a brushless motor, and a motor driving apparatus for driving the brushless motor, said motor driving apparatus being a motor driving apparatus as defined in claim 4.

26. An air blower having a brushless motor, and a motor driving apparatus for driving the brushless motor, said motor driving apparatus being a motor driving apparatus as defined in claim 4.

27. An electric vacuum cleaner having a brushless motor, and a motor driving apparatus for driving the brushless motor, said motor driving apparatus being a motor driving apparatus as defined in claim 4.

28. An electric dryer having a compressor including a brushless motor, and a motor driving apparatus for driving the brushless motor, said motor driving apparatus being a motor driving apparatus as defined in claim 4.

29. A heat pump type hot-water supply unit having a compressor including a brushless motor, and a motor driving apparatus for driving the brushless motor, said motor driving apparatus being a motor driving apparatus as defined in claim 4.

* * * * *